US010268646B2

(12) United States Patent
Jaech et al.

(10) Patent No.: US 10,268,646 B2
(45) Date of Patent: Apr. 23, 2019

(54) TENSOR-BASED DEEP RELEVANCE MODEL FOR SEARCH ON ONLINE SOCIAL NETWORKS

(71) Applicant: Facebook, Inc., Menlo Park, CA (US)

(72) Inventors: Aaron Jaech, Seattle, WA (US); Hetunandan Kamichetty, Seattle, WA (US); Eric Ringger, Seattle, WA (US); Charles Lester Clarke, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 164 days.

(21) Appl. No.: 15/615,713

(22) Filed: Jun. 6, 2017

(65) Prior Publication Data

US 2018/0349477 A1    Dec. 6, 2018

(51) Int. Cl.

| G06F 17/00 | (2019.01) |
|---|---|
| G06F 16/33 | (2019.01) |
| G05B 13/02 | (2006.01) |
| G06F 16/93 | (2019.01) |
| G06F 16/901 | (2019.01) |
| G06F 16/332 | (2019.01) |
| G06F 16/9535 | (2019.01) |

(52) U.S. Cl.
CPC ....... G06F 16/3334 (2019.01); G05B 13/029 (2013.01); G06F 16/3326 (2019.01); G06F 16/902 (2019.01); G06F 16/94 (2019.01); G06F 16/9535 (2019.01)

(58) Field of Classification Search
CPC .......... G06F 17/30864; G06F 17/3053; G06F 17/30554; G06F 17/30958
See application file for complete search history.

(56) References Cited

U.S. PATENT DOCUMENTS

| 5,918,014 | A | 6/1999 | Robinson |
|---|---|---|---|
| 6,539,232 | B2 | 3/2003 | Hendrey |
| 6,957,184 | B2 | 10/2005 | Schmid |
| 7,069,308 | B2 | 6/2006 | Abrams |
| 7,379,811 | B2 | 5/2008 | Rasmussen |
| 7,539,697 | B1 | 5/2009 | Akella |
| 7,752,326 | B2 | 7/2010 | Smit |
| 7,783,630 | B1 | 8/2010 | Chevalier |
| 7,797,635 | B1 | 9/2010 | Denise |
| 7,836,044 | B2 | 11/2010 | Kamvar |

(Continued)

OTHER PUBLICATIONS

Martin Abadi et al., "TensorFlow: Large-Scale Machine Learning on Heterogeneous Systems," http://tensorflow.org/, 2015.

(Continued)

*Primary Examiner* — Truong V Vo
(74) *Attorney, Agent, or Firm* — Baker Botts L.L.P.

(57) ABSTRACT

In one embodiment, a method includes receiving, from a client system associated with a user, a search query comprising a number of query terms, generating a query match-matrix for the search query, identifying a number of objects matching the search query, retrieving, for each identified object, an object match-matrix for the identified object, constructing, for each identified object, a three-dimensional tensor for the identified object, computing, for each identified object, a relevance score based on the tensor for the identified object, ranking the identified objects based on their respective relevance scores, and sending, to the first client system in response to the search query, instructions for generating a search-results interface for presentation to the user.

20 Claims, 11 Drawing Sheets

(56) References Cited

U.S. PATENT DOCUMENTS

| | | |
|---|---|---|
| 7,840,589 B1 | 11/2010 | Holt |
| 8,024,328 B2 | 9/2011 | Dolin |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |

(56) References Cited

U.S. PATENT DOCUMENTS

| | | |
|---|---|---|
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0074289 A1 | 3/2015 | Hyman |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniayskii |

OTHER PUBLICATIONS

Dzmitry Bandanau, Kyunghyun Cho, and Yoshua Bengio, "Neural machine translation by jointly learning to align and translate," *arXiv preprint arXiv*: 1409.0473, 2014.
Christopher J C Burges, "From RankNet to LambdaRank to LambdaMART: An overview," *Microsoft Research Technical Report MSR-TR-2010-82*, 2010.
Zhe Cao, Tao Qin, Tie-Yan Liu, Ming-Feng Tsai, and Hang Li, "Learning to rank: From pairwise approach to listwise approach," In Proceedings of *24th International Conference on Machine learning*, ACM, 129-136, Jun. 20, 2007.
Olivier Chapelle, Donald Metlzer, Ya Zhang, and Pierre Grinspan, "Expected reciprocal rank for graded relevance," In Proceedings of *18th ACM Conference on Information and Knowledge Management*. 621-630, Nov. 2, 2009.
Daniel Cohen, Qingyao Ai, and W. Bruce Croft, "Adaptability of neural networks on varying granularity IR tasks," *arXiv preprint arXiv*: 1606.07565, Jun. 24 2016.
Nick Craswell, W Bruce Croft, Jiafeng Guo, Bhaskar Mitra, and Maarten de Rijke, "Neu-IR: The SIGIR 2016 workshop on neural information retrieval," In Proceedings of the 39th International ACM SIGIR conference on Research and Development in Information Retrieval, 1245-1246, Jul. 17, 2016.
Fernando Diaz, Bhaskar Mitra, and Nick Craswell, "Query expansion with locally-trained word embeddings," *arXiv preprint arXiv*: 1605.07891, Jun. 23, 2016.
Jerome H Friedman, "Greedy function approximation: A gradient boosting machine," *Annals of statistics*, 1189-1232, Nov. 5, 2001.
Debasis Ganguly, Dwaipayan Roy, Mandar Mitra, and Gareth JF Jones, "Word embedding based generalized language model for information retrieval," In Proceedings of *38th International ACM SIGIR Conference on Research and Development in Information Retrieval*. ACM, 795-798, Aug. 9, 2015.
Alex Graves and Jürgen Schmidhuber, "Framewise phoneme classification with bidirectional LSTM and other neural network architectures," *Neural Networks* 18, 5 (2005), 602-610, Jul. 2005.
Mihajlo Grbovic, Nemanja Djuric, Vladan Radosavljevic, and Narayan Bhamidipati, "Search retargeting using directed query embeddings," In Proceedings of *24th International Conference on the World Wide Web*, ACM, 37-38, May 18, 2015.
Mihajlo Grbovic, Nemanja Djuric, Vladan Radosavljevic, Fabrizio Silvestri, and Narayan Bhamidipati, "Context-and content-aware embeddings for query rewriting in sponsored search," In Proceedings of *38th International ACM SIGIR Conference on Research and Development in Information Retrieval*. ACM, 383-392, Aug. 9, 2015.
Jiafeng Guo, Yixing Fan, Qingyao Ai, and W Bruce Croft, "A deep relevance matching model for ad-hoc retrieval," In Proceedings of *25th ACM International on Conference on Information and Knowledge Management*, 55-64, Oct. 24, 2016.
Geoffrey Hinton, Li Deng, Dong Yu, George E Dahl, Abdel-rahman Mohamed, Navdeep Jaitly, Andrew Senior, Vincent Vanhoucke, Patrick Nguyen, Tara N Sainath, and Brian Kingsbury, "Deep neural networks for acoustic modeling in speech recognition: The shared views of four research groups," *IEEE Signal Processing Magazine* 29, 6, 82-97, Oct. 18, 2012.
Sepp Hochreiter and Jürgen Schmidhuber, "Long short-term memory," Neural computation 9, 8, 1735-1780, Dec. 1997.
Po-Sen Huang, Xiaodong He, Jianfeng Gao, Li Deng, Alex Acero, and Larry Heck, "Learning deep structured semantic models for web search using clickthrough data," In Proceedings of *22nd ACM International Conference on Conference on Information & Knowledge Management*, 2333-2338, Oct. 27, 2013.
Kevin Jarrett, Koray Kavukcuoglu, Marc'Aurelio Ranzato and Yann LeCun, "What is the best multi-stage architecture for object recognition?," In Proceedings of *Computer Vision, 2009 IEEE 12th International Conference on*, IEEE, 2146-2153, Sep. 29, 2009.
Tom Kenter and Maarten de Rijke, "Short text similarity with word embeddings," In Proceedings of *24th ACM International on Conference on Information and Knowledge Management*, ACM, 1411-1420, Oct. 19, 2015.
Diederik Kingma and Jimmy Ba, "Adam: A method for stochastic optimization," *arXiv preprint arXiv*: 1412.6980, Dec. 22 2014.
Alex Krizhevsky, Ilya Sutskever, and Geoffrey E Hinton, "Imagenet classification with deep convolutional neural networks," In Proceedings of *Advances in neural information processing systems*, 25, 1097-1105, Dec. 3, 2012.
Siwei Lai, Liheng Xu, Kang Liu, and Jun Zhao, "Recurrent Convolutional Neural Networks for Text Classification," In Proceedings of *29th AAAI Conference on Artificial Intelligence*, 2267-2273, Jan. 25, 2015.
Yann LeCun and Yoshua Bengio, "Convolutional networks for images, speech, and time series," *The handbook of brain theory and neural networks* 3361, 10, 1995.
Yann LeCun, Yoshua Bengio, and Geoffrey Hinton, "Deep learning," *Nature* 521, 7553, 436-444, May 15, 2015.
Tie-Yan Liu, *Learning to rank for information retrieval*, Springer, Berlin, 2011.
Zhengdong Lu and Hang Li, "A deep architecture for matching short texts," In Proceedings of *Advances in Neural Information Processing Systems*, 1367-1375, Dec. 5, 2013.
Craig Macdonald, Rodrygo L. Santos, and Iadh Ounis, "The whens and hows of learning to rank for web search," *Information Retrieval* 16, 5, 584-628, Oct. 2013.
Donald Metzler and W. Bruce Croft, "A markov random field model for term dependencies," In Proceedings of *28th Annual International ACM SIGIR Conference on Research and Development in In-formation Retrieval*, 472-479, Aug. 15, 2005.
Tomas Mikolov, Kai Chen, Greg Corrado, and Jeffrey Dean, "Efficient estimation of word representations in vector space," *arXiv preprint arXiv*: 1301.3781, Jan. 16, 2013.
Tomas Mikolov, Ilya Sutskever, Kai Chen, Greg Corrado, and Jeffrey Dean, "Distributed Representations of Words and Phrases and Their Compositionality," In Proceedings of *26th International Conference on Neural Information Processing Systems*, 3111-3119, Dec. 5, 2013.
Bhaskar Mitra, "Exploring session context using distributed representations of queries and reformulations," In Proceedings of *38th International ACM SIGIR Conference on Research and Development in Information Retrieval*, ACM, 3-12, Aug. 9, 2015.
Bhaskar Mitra, Fernando Diaz, and Nick Craswell, "Learning to match using local and distributed representations of text for web search," *arXiv preprint arXiv*: 1610.08136, Oct. 26, 2016.
Eric Nalisnick, Bhaskar Mitra, Nick Craswell, and Rich Caruana, "Improving document ranking with dual word embeddings," In

(56) References Cited

OTHER PUBLICATIONS

Proceedings of *25th International Conference Companion on the World Wide Web*, 83-84, Apr. 11, 2016.

Hamid Palangi, Li Deng, Yelong Shen, Jianfeng Gao, Xiaodong He, Jianshu Chen, Xinying Song, and Rabab K. Ward, "Semantic Modelling with Long-Short-Term Memory for Information Retrieval," *arXiv preprint arXiv*: 1412.6629, Dec. 20, 2014.

Liang Pang, Yanyan Lan, Jiafeng Guo, Jun Xu, and Xueqi Cheng, "A study of matchpyramid models on ad-hoc retrieval,". *arXiv preprint arXiv*: 1606.04648, Jun. 15, 2016.

Liang Pang, Yanyan Lan, Jiafeng Guo, Jun Xu, Shengxian Wan, and Xueqi Cheng, "Text Matching as Image Recognition," *arXiv preprint arXiv*:1602.06359, Feb. 20, 2016.

Stephen E Robertson and Steve Walker, "Some simple effective approximations to the 2-poisson model for probabilistic weighted retrieval," In Proceedings of *17th Annual International ACM SIGIR Conference on Research and development in Information Retrieval*, 232-241, Jul. 3, 1994.

Hasim Sak, Andrew W Senior, and Françoise Beaufays, "Long short-term memory recurrent neural network architectures for large scale acoustic modeling," In Proceedings of *Interspeech*, 338-342, Sep. 14, 2014.

Gerard Salton and Christopher Buckley, "Term-weighting approaches in automatic text retrieval," *Information processing & management* 24, 5, 513-523, 1988.

Yelong Shen, Xiaodong He, Jianfeng Gao, Li Deng, and Grégoire Mesnil, "A latent semantic model with convolutional-pooling structure for information retrieval," In Proceedings of *23rd ACM International Conference on Conference on Information and Knowledge Management*, ACM, 101-110, Nov. 3, 2014.

Yelong Shen, Xiaodong He, Jianfeng Gao, Li Deng, and Grégoire Mesnil, "Learning semantic representations using convolutional neural networks for web search," In Proceedings of *23rd International Conference on the World Wide Web*, ACM, 373-374, Apr. 7, 2014.

Ilya Sutskever, Oriol Vinyals, and Quoc V Le, "Sequence to sequence learning with neural networks," In Proceedings of *Advances in neural information processing systems*, 3104-3112, Dec. 8, 2014.

Yonghui Wu et al., Google's Neural Machine Translation System: Bridging the Gap between Human and Machine Translation. *arXiv preprint arXiv*: 1609.08144, Sep. 26, 2016.

Liu Yang, Qingyao Ai, Jiafeng Guo, and W Bruce Croft, "aNMM: Ranking short answer texts with attention-based neural matching model," In Proceedings of *25th ACM International on Conference on Information and Knowledge Management*, ACM, 287-296, Oct. 24, 2016.

Shuangfei Zhai, Keng-hao Chang, Ruofei Zhang, and Zhongfei Mark Zhang, "Deepintent: Learning attentions for online advertising with recurrent neural networks," In Proceedings of the *22nd ACM SIGKDD International Conference on Knowledge Discovery and Data Mining*. ACM, 1295-1304, Aug. 13, 2016.

Aaron Jaech, Hetunandan Kamisetty, Eric Ringger, Charlie Clarke, "Match-Tensor: a Deep Relevance Model for Search," *arXiv preprim arXiv*: 1701.07795, Jan. 26, 2017.

TENSOR-BASED DEEP RELEVANCE MODEL FOR SEARCH ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may compute a relevance score of a document for a given query based on a Deep Neural Network (DNN) architecture. The relevance score may indicate a degree of relevance of the document for the given query with a real number between 0 and 1. A relevance score close to 0 may indicate that the document has weak relevance to the given query, while a relevance score close to 1 may indicate that the document has strong relevance to the given query. A significant number of traditional online search solutions have relied on a set of manually defined features. The social-networking system may need to invest significant effort into generating these features. Furthermore, when a new feature is added, the social-networking system may need to create and test new specialized code to compute the new feature. A new deep neural network architecture, referred to as a "Match-Tensor architecture," may be used for the search task in the online social network. The Match-Tensor architecture may avoid the above-mentioned inconvenience because the Match-Tensor architecture does not utilize feature engineering. In order to compute the relevance score of a document for a given query with the Match-Tensor architecture, the social-networking system may produce a pair of match-matrices, a query match-matrix and a document match-matrix, by separately processing term-embeddings of both document and the query with a neural network. The social-networking system may produce a three-dimensional tensor, referred to as a "Match-Tensor," by taking an element-wise product of the query match-matrix and the document match-matrix. The social-networking system may add an exact-match channel to the Match-Tensor. An element (i,j) of the exact-match channel may be set to a non-zero value if an i-th term in the search query matches to a j-th term in the document. The element (i,j) may be set to a zero value otherwise. The social-networking system may employ a downstream neural network to compute a relevance score reflecting a degree of relevance of the document to the query based on the Match-Tensor. The entire network may be trained end-to-end with a discriminative objective. As an example and not by way of limitation, the social-networking system may compute a relevance score of an article from the year 2015 containing a sentence "Golden State downed the Cleveland Cavaliers 105-97 on Tuesday in Game 6 of the NBA Finals to earn its first championship since 1975," to a query "Cleveland wins NBA championship." By way of background, the Golden State Warriors and Cleveland Cavaliers, National Basketball Association (NBA) basketball teams, met at the NBA finals two years in a row. The Golden State Warriors won the championship in 2015 finals and the Cleveland Cavaliers won the championship in 2016 finals. On its face, the article, written in 2015, with the sentence "Golden State downed the Cleveland Cavaliers 105-97 on Tuesday in Game 6 of the NBA Finals to earn its first championship since 1975" will have a high textual relevance to the query "Cleveland wins NBA championship," because most of the terms in the query match terms in the article. However, because the query is intend to be about 2016 NBA finals, the article from 2015 is not actually relevant to the intent of the query. The Match-Tensor architecture may help address this problem of mismatch between query intent and retrieved results. The social-networking system may calculate term-embeddings for each and every term in the query. Because the query has four terms, the query term-embeddings may become a 4-by-n matrix, where n is the size of an embedding vector. The social-networking system may produce a 4-by-k query match-matrix by encoding the query term-embeddings with a neural network, where k is a predetermined number of columns of a match-matrix. The social-networking system may also calculate term-embeddings for each and every term in the article. The size of the article term-embeddings may be m-by-n, where m is the number of total terms in the article. The social-networking system may produce an m-by-k article match-matrix by encoding the article term-embeddings with a neural network. The social-networking system may produce a 4-by-m-by-k Match-Tensor for the query and the article by taking an element-wise product of the query match-matrix and the article match-matrix. For example, when a value of an element (i,j) of the query match-matrix is $\alpha$ and a value of an element (h, j) of the article match-matrix is $\beta$, the value of an element (i, h, j) of the Match-Tensor may be $\alpha \cdot \beta$. The social-networking system may add an exact-match channel to the Match-Tensor. In the query, 'Cleveland' is the first term, 'NBA' is the third term, and 'championship' is the fourth term. When the first term 'Golden' in the aforementioned example sentence is the t-th term in the article, 'Cleveland' is the (t+4)-th term, 'NBA' is the (t+16)-th term, and 'championship' is the (t+22)-nd term in the article. Elements (1, t+4), (3, t+16), and (4, t+22) of the exact-match channel may be set to a non-zero value because the (t+4)-th term in the article matches exactly to the first term in the query, the (t+16)-th term in the article matches exactly to the third term in the query, and the (t+22)-nd term in the article matches exactly to the fourth term in the query. A zero value may be set to an element (i, j) of the exact-match channel if an i-th term in the query does not match to a j-th term in the article. For example, element (1, t) in the exact-match channel may be set to a zero value because the first term in the query 'Cleveland' does not match to the t-th term in the article 'Golden.' The exact-match channel may present not only matching words but also their patterns. The social-networking system may determine that the article has low relevance to the given query in this example based on the exact-match channel. After adding the exact-match channel to the tensor, the size of the Match-Tensor may become 4-by-m-by-k+1. The social-networking system may compute a relevance score reflecting a degree of relevance of the article to the query by processing the Match-Tensor with a downstream neural network. The produced relevance score may be low even though the query and the article have a number of common words.

In particular embodiments, the relevance score may be used for ranking a number of objects of the online social network for their relevance to a given query. The social-networking system may receive a search query comprising a plurality of query terms from a client system. The social-networking system may generate a query match-matrix for the search query. A first dimension of the query match-matrix corresponds to the query terms in the search query and a second dimension of the query match-matrix corresponds to n-dimensional embeddings representing the query terms in the search query, respectively, in an n-dimensional embedding space. The social-networking system may, in order to generate the query match-matrix for the search query, generate a plurality of term-embeddings associated with the plurality of query terms, respectively, based on a prepared word-embedding table. Each of the term-embeddings corresponds to a point in a d-dimensional embedding space. The social-networking system may produce a query match-matrix for the search query by encoding the generated term-embeddings with a neural network. The query match-matrix may represent contextual meanings of the terms in the query, respectively, based on neighboring words and words located far behind or far ahead of the terms. In particular embodiments, the social-networking system may adjust a size of the second dimension of the query match-matrix by performing a linear projection of the query match-matrix. In particular embodiments, the social-networking system may use a bi-directional Long Short-Term Memory (LSTM) network as the neural network for encoding the generated term-embeddings. A bi-LSTM may comprise a series of states connected in forward and backward directions. Each state of the bi-LSTM may take a term embedding for a respective term in the search query as an input and may produce an encoded term embedding as an output by processing input term embedding and signals from both neighboring states. The output encoded term embedding may represent the contextual meaning of the corresponding term in the search query. In particular embodiments, the social-networking system may create the prepared word-embedding table using a word-embedding model based on text contents of a plurality of objects created during a predetermined period of time. The prepared word-embedding table may comprise unigrams and a plurality of selected bigrams. In particular embodiments, the social-networking system may use word2vec model as the word embedding model.

The social-networking system may identify a plurality of objects matching the search query. In particular embodiments, the social-networking system may identify the plurality of objects that contain text in their respective text content that matches one or more of the query terms. In particular embodiments, the social-networking system may identify a set of candidate objects stored in one or more data stores. The social-networking system may retrieve, for each candidate object, an object match-matrix associated with the candidate object. The social-networking system may compute, for each candidate object, a similarity score representing a degree of similarity between the retrieved object match-matrix for the candidate object and the query match-matrix for the search query by comparing the object match-matrix and the query match-matrix. The social-networking system may identify objects that have the similarity score higher than a threshold. The social-networking system may receive, from a client system, a request to post a first object to the computing system. The social-networking system may construct an object match-matrix for the first object and may store the object match-matrix in the one or more data stores. The social-networking system may store the object with a link to the object match-matrix in the one or more data stores. The social-networking system may, in order to construct an object match-matrix for the first object, generate a plurality of term-embeddings associated with a plurality of terms in the text content of the first object, respectively, based on a prepared word-embedding table. Each of the term-embeddings corresponds to a point in a d-dimensional embedding space. The social-networking system may produce the object match-matrix for the first object by encoding the generated term-embeddings with a neural network, The object match-matrix may represent contextual meanings of the terms in the text content of the first object, respectively, based on neighboring words and words located far behind or far ahead of the terms. The social-networking system may retrieve, for each identified object, an object match-matrix for the identified object. A first dimension of the object match-matrix may correspond to terms appearing in a text content of the object and a second dimension of the object match-matrix may correspond to n-dimensional embeddings representing the terms in the text content of the object, respectively, in the n-dimensional embedding space. The social-networking system may construct, for each identified object, a three-dimensional tensor for the identified object by taking an element-wise product of the query match-matrix for the search query and the object match-matrix for the identified object. A first dimension of the tensor may correspond to the query terms in the search query, a second dimension of the tensor may correspond to terms appearing in the text content of the object, and a third dimension of the tensor may correspond to the predetermined number of match channels. Each match channel may calculate a weighted match similarity between the query and the object text, where the weighting for each channel is based on state-specific signals of the query and object text. The social-networking system may append, to each tensor, an exact-match channel. An entry at position (i,j) of the exact-match channel may be set to a non-zero value if an i-th term in the search query is an exact match to a j-th term in the text of the object and may be set to a zero value otherwise. In particular embodiments, the social-networking system may determine the non-zero value through a backpropagation process. For the backpropagation process, the social-networking system may prepare a set of a plurality of pairs of a search query and an object and their respective match-matrices. A desired relevance score for each pair may be known. The social-networking system may set an arbitrary value to the non-zero value. The social-networking system may perform an iterative process for a number of iterations. The number of iterations may be greater or equal to the number of the pairs. The social-networking system may, as a first step of the iterative process, select a pair of a search query and an object in order from the prepared set. The social-networking system may, as a second step of the iterative process, construct a three-dimensional tensor by taking an element-wise product of the query match-matrix for the selected search query and the object match-matrix for the selected object. The social-networking system may, as a third step of the iterative process, compute a relevance score based on the tensor for the selected pair. The social-networking system may, as a fourth step of the iterative process, compare the computed relevance score with the known desired relevance score. The social-networking system may, as a fifth step of the iterative process, adjust the non-zero value based on the comparison.

The social-networking system may compute, for each identified object, a relevance score based on the tensor for the identified object, where the relevance score may represent a degree of relevance of the object to the search query. In particular embodiments, the social-networking system may generate a first three-dimensional matrix by performing a first series of convolutions on the tensor with one or more sets of first-convolution filters. Each of the one or more sets of the first-convolution filters comprises a plurality of n-by-m-by-k first-convolution filters, where n is a first dimension size of the filter, m is a second dimension size of the filter, and k is a third dimension size of the filter. The first dimension of a first-convolution filter may correspond to the query terms. The second dimension of the filter may correspond to the terms in the text content of the object. The third dimension of the filter may correspond to the match channels. The third dimension size k may be equal to the number of match channels of the tensor. In particular embodiments, the social-networking system may apply a Rectified Linear Unit (ReLU) activation function to the first three-dimensional matrix. In particular embodiments, the social-networking system may generate a second three-dimensional matrix by performing a second series of convolutions with a plurality of second-convolution filters on the first three-dimensional matrix. A size of the second-convolution filters may be 1-by-1-by-k', where k' may be equal to a size of a third dimension of the first three-dimensional matrix. The third dimension of the first three-dimensional matrix may correspond to convolution layers, where each convolution layer may comprise output of convolutions with a particular first-convolution filter. A third dimension of the second three-dimensional matrix may correspond to convolution layers, where each convolution layer may comprise output of convolutions with a particular second-convolution filter. In particular embodiments, the social-networking system may construct a predetermined size vector by performing a max-pooling procedure on the second three-dimensional matrix. In particular embodiments, the social-networking system may choose, as a first step of the max-pooling procedure, for each convolution layer of the second three-dimensional matrix, a maximum value. In particular embodiments, the social-networking system may fill, as a second step of the max-pooling procedure, a corresponding element of the vector with the chosen value. In particular embodiments, the social-networking system may calculate a relevance score by performing a sigmoid activation on the vector. The sigmoid activation on the vector may produce a real-number score between 0 and 1. In particular embodiments, the social-networking system may rank the identified objects based on their respective relevance scores. In particular embodiments, the social-networking system may send, to the first client system in response to the search query, instructions for generating a search-results interface for presentation to the first user, the search-results interface comprising references to one or more of the identified objects presented in ranked order.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
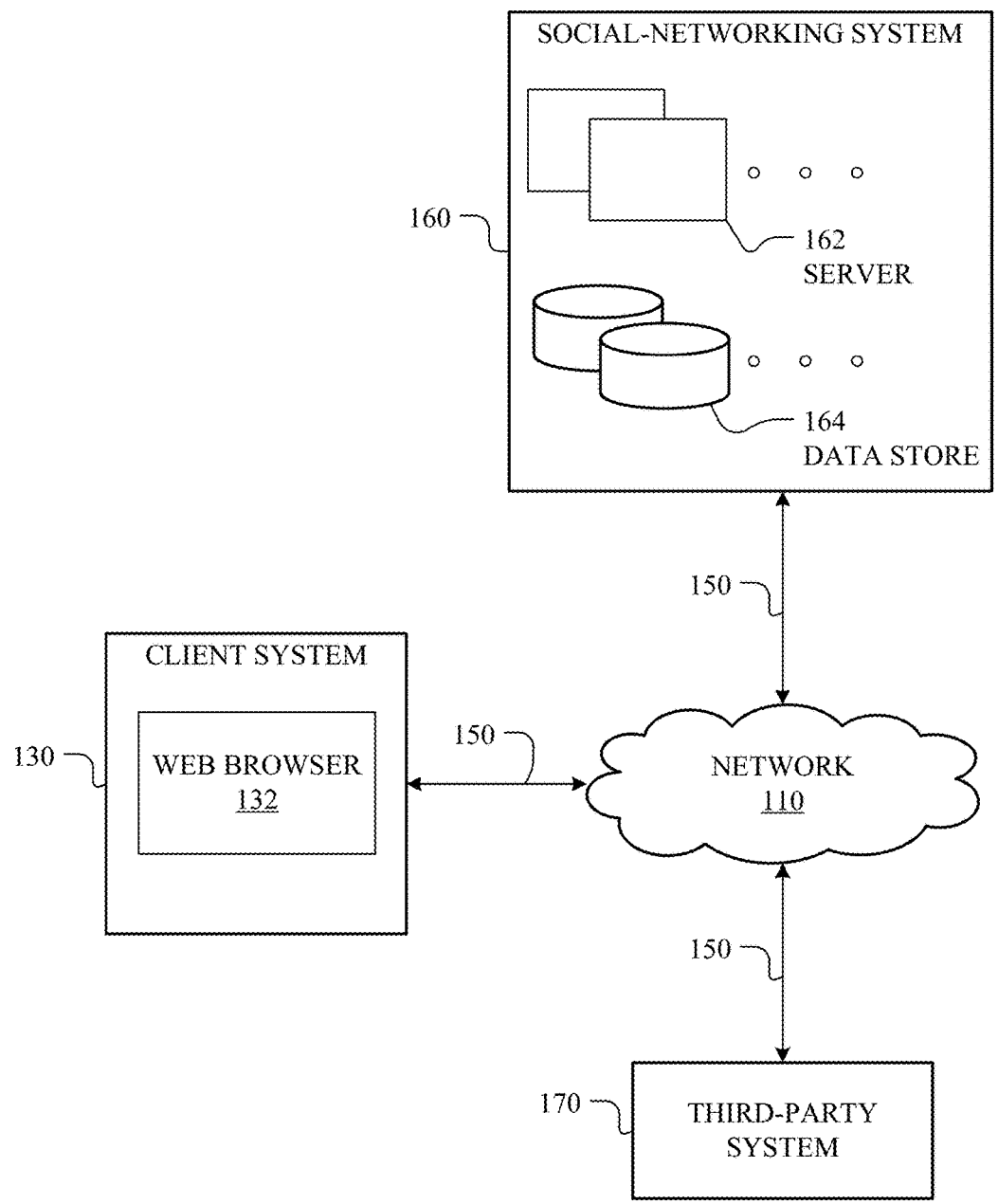
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
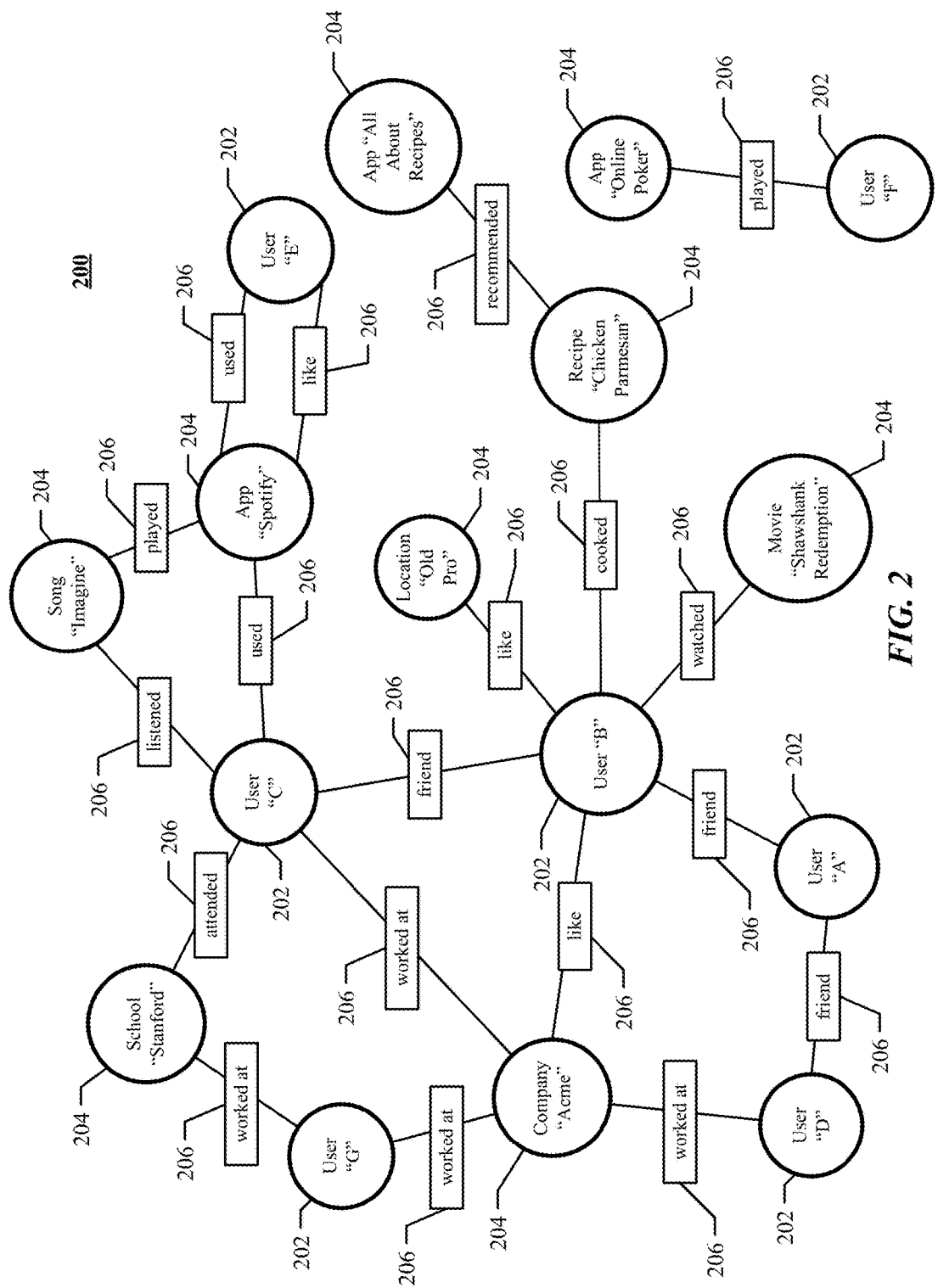
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Vector Spaces and Embeddings

Figure 3:
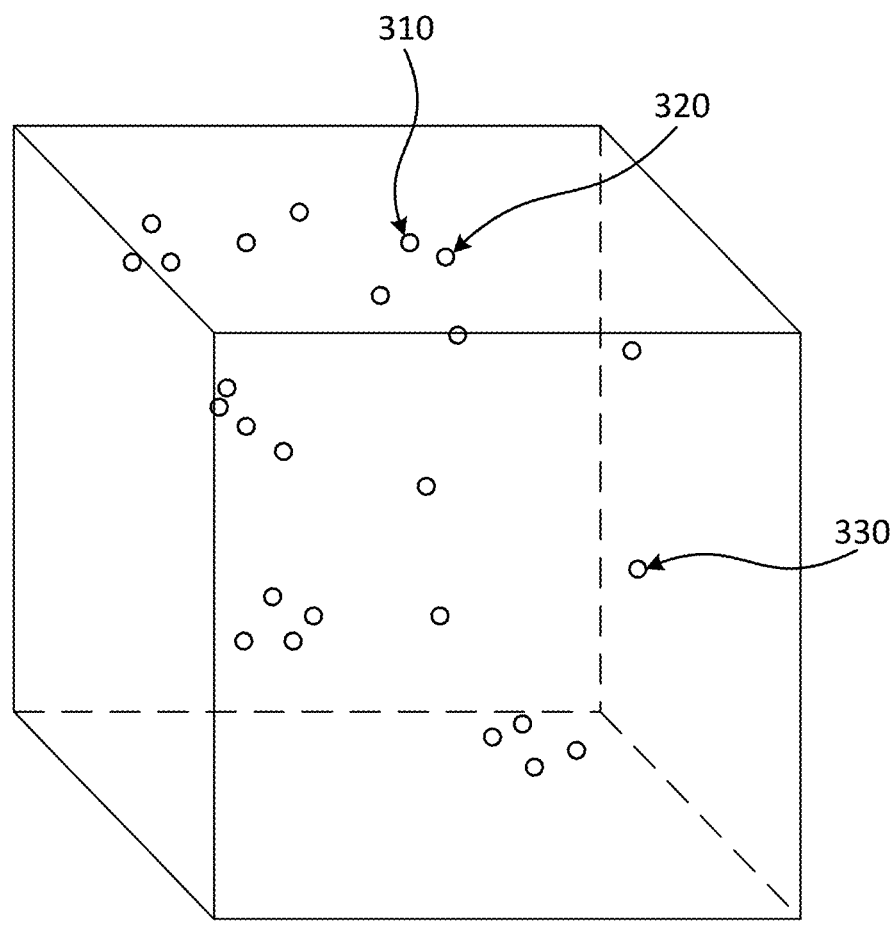
FIG. 3 illustrates an example view of an embedding space.

FIG. 3 illustrates an example view of a vector space 300. In particular embodiments, an object or an n-gram may be represented in a d-dimensional vector space, where d denotes any suitable number of dimensions. Although the vector space 300 is illustrated as a three-dimensional space, this is for illustrative purposes only, as the vector space 300 may be of any suitable dimension. In particular embodiments, an n-gram may be represented in the vector space 300 as a vector referred to as a term embedding. Each vector may comprise coordinates corresponding to a particular point in the vector space 300 (i.e., the terminal point of the vector). As an example and not by way of limitation, vectors 310, 320, and 330 may be represented as points in the vector space 300, as illustrated in FIG. 3. An n-gram may be mapped to a respective vector representation. As an example and not by way of limitation, n-grams $t_1$ and $t_2$ may be mapped to vectors $\vec{v_1}$ and $\vec{v_2}$ in the vector space 300, respectively by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as word2vec, may be used to map an n-gram to a vector representation in the vector space 300. In particular embodiments, an n-gram may be mapped to a vector representation in the vector space 300 by using a machine leaning model (e.g., a neural network). The machine learning model may have been trained using a sequence of training data (e.g., a corpus of objects each comprising n-grams).

In particular embodiments, an object may be represented in the vector space 300 as a vector referred to as a feature vector or an object embedding. As an example and not by way of limitation, objects $e_1$ and $e_2$ may be mapped to vectors $\vec{v_1}$ and $\vec{v_2}$ in the vector space 300, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 300. A similarity metric may be a cosine similarity, a Minkowski distance, a Mahalanobis distance, a Jaccard similarity coefficient or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 300. As an example and not by way of limitation, vector 310 and vector 320 may correspond to objects that are more similar to one another than the objects corresponding to vector 310 and vector 330, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Tensor-Based Deep Relevance Model for Search

Background

The social-networking system may aim to learn a function Φ(q, d) that computes a score reflecting the relevance of document d for query q. The social-networking system may, with a traditional feature engineering approach, start with creating a set of hand-crafted features F that capture various aspects of relevance matching, combine them in a single model M (e.g., logistic regression or boosted decision trees), and train the model using a learning-to-rank approach [3, 4] to predict the labels on training data:

$$\Phi(q,d)=M(F(q,d))$$

The features employed in this approach may be as simple as binary query term presence in the document or as complex as separately trained classification or ranking sub-models. Furthermore, including classic information retrieval models, particularly Best Match 25 (BM25) [37], in this feature set may be a standard approach. Liu [25] provides a thorough overview of traditional learning-to-rank methods for search. Macdonald et al. [27] cover many of the engineering issues associated with deploying learning-to-rank in a search engine.

The advent of Deep Neural Networks (DNN) has led to the development of an exciting alternative, in which a single learning procedure is used to learn both features and a model simultaneously. Huang et al. [17] introduced the first Deep Neural Network architectures for Web search that operated on (query, title) pairs, using a so-called siamese architecture [23], in which two feed-forward networks $NN_Q$ and $NN_D$ map the query q and the title of a given web document d, respectively, into fixed-length representations:

$$\Phi(q,d)=\cos(NN_Q(q),NN_D(d)),$$

The social-networking system may, in this approach, then rank the final documents based on their similarity to the query in this space computed using cosine similarity. The application of convolutional neural networks, in lieu of feed-forward-networks, by Shen et al. [41] marks the next notable advancement using the same siamese architecture. The local connectivity of convolutional networks can allow for more accurate models, especially when the local connectivity mirrors the structure of the task at hand.

In parallel to these developments, Deep Neural Networks (DNNs) have made a number of advances, especially for modeling text. While earlier approaches to DNNs for text used convolutional networks, more recent approaches have used Recurrent Neural Networks (RNNs), especially those based on Long Short-term Memory (LSTM) units [16]. Unlike convolutional networks, the units in recurrent networks maintain an internal state that is updated from word to word as a given text is processed, allowing for the network to capture sequential relations across a query or document. A popular architecture for machine translation uses the so-called sequence-to-sequence paradigm in which the input text in the source language is "encoded" using an encoder network to produce a fixed-length representation (the RNN state) [42]. A "decoder" then begins with this representation and emits an output in the target language. While the use of a fixed-length representation is similar to the architecture of Huang et al. [17] and Shen et al. [41], the use of RNNs such as those based on LSTMs is critical to their performance. Attention-based schemes build on this architecture by dynamically re-weighting (i.e., focusing attention) on various elements of the source representation during the decoding process, and they have demonstrated considerable improvements over their non-attention counterparts [2].

The "representation-based" nature of siamese architectures has also been identified as a limitation in search [14] and has led to the development of alternate "interaction-based" architectures, in which the relationships between query and document are considered earlier. In an approach called Match-Pyramid, Pang et al. [36] construct an interaction matrix between query and document terms, where each entry in the matrix denotes the strength of similarity between the corresponding terms. A hierarchical convolutional model then operates on this single interaction matrix to compute the final score. Mitra et al. [32] propose a "duet" architecture in which two separate networks (one "representation"-based and the other "interaction"-based) are combined to simultaneously account for local and distributed measures of similarity. The key idea in this method is to use an exact-match matrix followed by convolutional layers on the "interaction" half of the network in addition to a siamese architecture. A crucial limitation of such an approach to modeling interactions is that all tokens in the query are given equal importance: the interaction model can therefore not distinguish between query terms that are important and those that are not [39].

Match-Tensor Architecture

In particular embodiments, the social-networking system 160 may compute a relevance score of a document for a given query based on a Deep Neural Network (DNN) architecture. The relevance score may indicate a degree of relevance of the document for the given query with a real number between 0 and 1. A relevance score close to 0 may indicate that the document has weak relevance to the given query, while a relevance score close to 1 may indicate that the document has strong relevance to the given query. A significant number of traditional online search solutions have relied on a set of manually defined features. The social-networking system 160 may need to invest significant effort into generating these features. Furthermore, when a new feature is added, the social-networking system 160 may need to create and test new specialized code to compute the new feature. A new deep neural network architecture, referred to as a "Match-Tensor architecture," may be used for the search task in the online social network. The Match-Tensor architecture may avoid the above-mentioned inconvenience because the Match-Tensor architecture does not utilize feature engineering. In order to compute the relevance score of a document for a given query with the Match-Tensor architecture, the social-networking system 160 may produce a pair of match-matrices, a query match-matrix and a document match-matrix, by separately processing term-embeddings of both document and the query with a neural network. The social-networking system 160 may produce a three-dimensional tensor, referred to as a "Match-Tensor," by taking an element-wise product of the query match-matrix and the document match-matrix. The social-networking system 160 may add an exact-match channel to the Match-Tensor. An element (i,j) of the exact-match channel may be set to a non-zero value if an i-th term in the search query matches to a j-th term in the document. The element (i,j) may be set to a zero value otherwise. The social-networking system 160 may employ a downstream neural network to compute a relevance score reflecting a degree of relevance of the document to the query based on the Match-Tensor. The entire network may be trained end-to-end with a discriminative objective. As an example and not by way of limitation, the social-networking system 160 may compute a relevance score of an article containing a sentence "Golden State downed the Cleveland Cavaliers 105-97 on Tuesday in Game 6 of the NBA Finals to earn its first championship since 1975," to a query "Cleveland wins NBA championship." By way of background, the Golden State Warriors and Cleveland Cavaliers, National Basketball Association (NBA) basketball teams, met at the NBA finals two years in a row. The Golden State Warriors won the championship in 2015 finals and Cleveland Cavaliers won the championship in 2016 finals. On its face, the article, written in 2015, with the sentence "Golden State downed the Cleveland Cavaliers 105-97 on Tuesday in Game 6 of the NBA Finals to earn its first championship since 1975" will have a high textual relevance to the query "Cleveland wins NBA championship," because most of the terms in the query match terms in the article. However, because the query is intend to be about 2016 NBA finals, the article from 2015 is not actually relevant to the intent of the query. The Match-Tensor architecture may help address this problem of mismatch between query intent and retrieved results. The social-networking system 160 may calculate term-embeddings for each and every term in the query. Because the query has four terms, the query term-embeddings may become a 4-by-n matrix, where n is the size of an embedding vector. The social-networking system 160 may produce a 4-by-k query match-matrix by encoding the query term-embeddings with a neural network, where k is a predetermined number of columns of a match-matrix. The social-networking system 160 may also calculate term-embeddings for each and every term in the article. The size of the article term-embeddings may be m-by-n, where m is the number of total terms in the article. The social-networking system 160 may produce an m-by-k article match-matrix by encoding the article term-embeddings with a neural network. The social-networking system 160 may produce a 4-by-m-by-k Match-Tensor for the query and the article by taking an element-wise product of the query match-matrix and the article match-matrix. For example, when a value of an element (i,j) of the query match-matrix is α and a value of an element (h, j) of the article match-matrix is β, the value of an element (i, h, j) of the Match-Tensor may be α·β. The social-networking system 160 may add an exact-match channel to the Match-Tensor. In the query, 'Cleveland' is the first term, 'NBA' is the third term, and 'championship' is the fourth term. When the first term 'Golden' in the aforementioned example sentence is the t-th term in the article, 'Cleveland' is the (t+4)-th term, 'NBA' is the (t+16)-th term, and 'championship' is the (t+22)-nd term in the article. Elements (1, t+4), (3, t+16), and (4, t+22) of the exact-match channel may be set to a non-zero value because the (t+4)-th term in the article matches exactly to the first term in the query, the (t+16)-th term in the article matches exactly to the third term in the query, and the (t+22)-nd term in the article matches exactly to the fourth term in the query. A zero value may be set to an element (i, j) of the exact-match channel if an i-th term in the query does not match to a j-th term in the article. For example, element (1, t) in the exact-match channel may be set to a zero value because the first term in the query 'Cleveland' does not match to the t-th term in the article 'Golden.' The exact-match channel may present not only matching words but also their patterns. The social-networking system may determine that the article has low relevance to the given query in this example based on the exact-match channel. After adding the exact-match channel to the tensor, the size of the Match-Tensor may become 4-by-m-by-k+1. The social-networking system 160 may compute a relevance score reflecting a degree of relevance of the article to the query by processing the Match-Tensor with a downstream neural network. The produced relevance score may be low even though the query and the article have a number of common words. Although this disclosure describes determining a degree of relevance of a document to a given query based on a three-dimensional tensor in a particular manner, this disclosure contemplates determining a degree of relevance of a document to a given query based on a three-dimensional tensor in any suitable manner.

In particular embodiments, the social-networking system 160 may create a word-embedding table using a word-embedding model based on text contents of a plurality of objects created during a predetermined period of time. In order to process online search queries, the social-networking system 160 may need to create word-embeddings for queries as well as object text contents. When the social-networking system 160 generates word-embeddings, the social-networking system 160 may map an n-gram to a vector representation in the vector space 300 by utilizing a dictionary called a word-embedding table. The word-embedding table may be itself generated via training using a sequence of training data (e.g., a corpus of objects each comprising n-grams). As an example and not by way of limitation, the social-networking system 160 may create a word-embedding table using all the objects posted during the last 8 weeks by analyzing the contexts of the n-grams in the used objects. The social-networking system 160 may include all the identified unigrams and a plurality of selected bigrams to the word-embedding table. In particular embodiments, the social-networking system 160 may use word2vec model as the word embedding model. As another example and not by way of limitation, the social-networking system 160 may create a word-embedding table regular basis. Although this disclosure describes creating a word-embedding table in a particular manner, this disclosure contemplates creating a word-embedding table in any suitable manner.

In particular embodiments, the social-networking system 160 may receive, from a client system 130, a request to post a first object to the computing system. The social-networking system 160 may construct an object match-matrix for the first object. A first dimension of the object match-matrix corresponds to the terms in the text of the object and a second dimension of the object match-matrix corresponds to n-dimensional embeddings representing the terms in text of the object, respectively, in an n-dimensional embedding space. The object match-matrix may be used for a deep relevance model based online search query processing. When the social-networking system 160 receives a search query, the social-networking system 160 may identify candidate objects that have potential to be a part of the search result. The social-networking system 160 may construct object match-matrices for all the candidate objects after the social-networking system 160 receives the search query. However, constructing an object match-matrix may require considerable computing power and time. Thus, constructing a large number of object match-matrices at a search processing time may cause a bottleneck in the search processing and may slow down the processing. To overcome this limitation, the social-networking system 160 may construct an object match-matrix for an object when the social-networking system 160 receives a request to post the object from a client system 130. After constructing the object match-matrix, the social-networking system 160 may store the object match-matrix in one or more data stores. The social-networking system 160 may also store the first object with a link to the object match-matrix in the one or more data stores. As an example and not by way of limitation, the social-networking system 160 may receive a request from a user of the online social network to post a short message saying "Lea Michele+Ariana Grande on the same tv show? We can't wait for this!" The social-networking system 160 may construct an object match-matrix for the message and store the constructed object match-matrix. The social-networking system 160 may also store the message as a post. The location information to the object match-matrix may be stored along with the post so that the social-networking system 160 may retrieve the object match-matrix whenever needed. As another example and not by way of limitation, a user named "Ariana Sanchez" may check in her current location and activity on the online social network. The social-networking system 160 may receive a request from the client system 130 associated with Ariana Sanchez to post the check-in message saying "Ariana Sanchez watching Friends (TV show) at Ariana's home." The social-networking system 160 may construct an object match-matrix for the check-in message and store the object match-matrix. The social-networking system 160 may also store the post along with a link to the object match-matrix. Although this disclosure describes constructing an object match-matrix in a particular manner, this disclosure contemplates constructing an object match-matrix in any suitable manner.

In particular embodiments, the social-networking system 160 may, in order to construct an object match-matrix for the first object, generate a plurality of term-embeddings associated with a plurality of terms in the text content of the first object, respectively, based on a prepared word-embedding table. Each of the term-embeddings corresponds to a point in a d-dimensional embedding space, where the point in the d-dimensional embedding space may represent contextual meaning of the term determined based on a large corpus of training data (for example, 100 million documents). The social-networking system 160 may convert terms in the text of the first object into a series of term-embeddings by looking-up terms in the prepared word-embedding table. In particular embodiments, the social-networking system 160 may produce the object match-matrix for the first object by encoding the generated term-embeddings with a neural network. The object match-matrix may represent contextual meanings of the terms in the text content of the first object, respectively, based on neighboring words and words located far behind and far ahead of the terms. As an example and not by way of limitation, the social-networking system 160 may encode a set of term-embeddings into a match-matrix with bi-directional Long Short-Term Memory (bi-LSTM). A bi-LSTM may comprise a series of memory states connected in forward and backward directions. When processing a set of term-embeddings, a memory state in the bi-LSTM may correspond a term. A memory state can remember the previous and following states. Each memory state of the bi-LSTM may take a term embedding for a respective term in the text as an input and may produce an encoded term embedding as an output by processing input term embedding and signals from both neighboring states. The output encoded term embedding may reflect the contextual meaning of the corresponding term in the text capturing both immediate and larger contexts in the text. As another example and not by way of limitation, the social-networking system 160 may adjust a size of the object match-matrix by performing a linear projection of the object match-matrix. A linear projection may allow the size of embeddings to be varied and tuned as a hyperparameter without relearning the embeddings from scratch each time. A linear projection may be applied to the term-embeddings before the encoding by the neural network or after the encoding, or both before and after the encoding to adjust the number of dimensions of the embedding space as necessary. Although this disclosure describes how to construct an object match-matrix in a particular manner, this disclosure contemplates constructing an object match-matrix in any suitable manner.

In particular embodiments, the social-networking system 160 may receive a search query comprising a plurality of query terms from a client system 130. The search query may comprise one or more query terms. A user of an online social network may search for information relating to a specific subject matter (e.g., users, concepts, external content or resource, other suitable subject matter) by providing a short phrase describing the subject matter, often referred to as a "search query," to the social-networking system 160. The client system 130 may access the social-networking system 160 using a web browser 132, or a native application associated with the social-networking system 160 (e.g., a mobile social-networking application, a messaging application, another suitable application, or any combination thereof), either directly, via a network 110, or via a third-party system 170. When the user enters the search query in the query field and clicks a "search" button or takes an action that has an equivalent effect, the client system 130 may send the search query to the social-networking system 160 using, for example, an HTTP request. As an example and not by way of limitation, an online social network user may want to search posts regarding television shows featuring a pop star "Ariana Grande" because the user is a fan of Ariana Grande. When the user types "Ariana TV shows" in the query field and clicks a "Search" button, the client system 130 associated with the user may send the search query to the social-networking system 160. Although this disclosure describes the social-networking system 160 receiving a search query in a particular manner, this disclosure contemplates the social-networking system 160 receiving a search query in any suitable manner.

In particular embodiments, the social-networking system 160 may generate a query match-matrix for the search query. A first dimension of the query match-matrix corresponds to the query terms in the search query and a second dimension of the query match-matrix corresponds to n-dimensional embeddings representing the query terms in the search query, respectively, in an n-dimensional embedding space. In particular embodiments, the social-networking system 160 may, in order to generate the query match-matrix for the search query, generate a plurality of term-embeddings associated with the plurality of query terms, respectively, based on a prepared word-embedding table. Each of the term-embeddings corresponds to a point in a d-dimensional embedding space. The social-networking system 160 may convert terms in the search query into a series of term-embeddings by looking-up terms in the prepared word-embedding table. A term embedding may represent contextual meaning of the corresponding term in the d-dimensional embedding space, where the contextual meaning may be determined based on a large corpus of training data. In particular embodiments, the social-networking system 160 may produce a query match-matrix for the search query by encoding the generated term-embeddings with a neural network. The query match-matrix may represent contextual meanings of the terms in the query, respectively, based on neighboring words and words located far behind or far ahead of the terms in the query. As an example and not by way of limitation, continuing with the prior example, the social-networking system 160 may generate term-embeddings for "Ariana TV shows" after receiving the search query from a client system 130. The generated term-embeddings may be a 3-by-256 matrix, where each term embedding may be a vector with 256 real-number elements. The social-networking system 160 may produce a query match-matrix by encoding the generated term-embeddings with a neural network. A size of the query match-matrix may be 3-by-40. The query match-matrix may represent contextual meanings of terms in the query with much smaller embedding space than the term-embeddings. Although this disclosure describes producing a query match-matrix for a given search query in a particular manner, this disclosure contemplates producing a query match-matrix for a given search query in any suitable manner.

In particular embodiments, the social-networking system 160 may encode a set of term-embeddings into a match-matrix with bi-LSTM. A bi-LSTM may comprise a series of memory states connected in forward and backward directions. When processing a set of term-embeddings, a memory state in the bi-LSTM may correspond to a term. A memory state can remember the previous and following states. Each memory state of the bi-LSTM may take a term embedding for a respective term in the search query as an input and may produce an encoded term embedding as an output by processing input term embedding and signals from both neighboring states. The output encoded term embedding may reflect the contextual meaning of the corresponding term in the search query capturing both immediate and larger contexts in the search query. As an example and not by way of limitation, continuing with the prior example, the social-networking system 160 may encode the term-embeddings for "Ariana TV shows" with bi-LSTM in order to produce a query match-matrix. A memory state of the bi-LSTM corresponding 'TV' in the search query may take a term embedding for 'TV' as an input. The input term embedding for 'TV' may represent a contextual meaning of 'TV' learned from a large corpus of training data. The memory state corresponding 'TV' may take signals from neighboring memory states, a memory state corresponding 'Ariana' and a memory state corresponding 'shows', and produce a new embedding of 'TV' reflecting contextual meaning of 'TV' within the search query. A size of the second dimension of the query match-matrix may be different from the size of the second dimension of the input term-embeddings. The size of the query match-matrix in this example may be 3-by-30. Although this disclosure describes encoding term-embeddings with a neural network in a particular manner, this disclosure contemplates encoding term-embeddings with a neural network in any suitable manner.

In particular embodiments, the social-networking system 160 may adjust a size of the second dimension of the query match-matrix by performing a linear projection of the query match-matrix. A linear projection may allow the size of embeddings to be varied and tuned as a hyperparameter without relearning the embeddings from scratch each time. A linear projection may be applied to the term-embeddings before the encoding by the neural network or after the encoding, or both before and after the encoding to adjust the number of dimensions of the embedding space as necessary. As an example and not by way of limitation, the social-networking system 160 may transform term-embeddings of size n-by-256 for a search query into embeddings of size n-by-40 by performing a linear projection, where n is the number of terms in the search query. As another example and not by way of limitation, the social-networking system 160 may transform a query match-matrix of size n-by-30 into a match-matrix of size n-by-50 by performing a linear projection, where n is the number of terms in the search query. Although this disclosure describes adjusting a size of embeddings in a particular manner, this disclosure contemplates adjusting a size of embeddings in any suitable manner.

In particular embodiments, the social-networking system 160 may identify a plurality of objects matching the search query. On receiving a search query from a client system 130, the social-networking system 160 may prepare a set of objects as search results. The search results may be sorted based on a degree of relevance of objects to the given query, which may be represented by a relevance score. Because computing the relevance scores for all the objects in the system for any given search query may not be a feasible solution, the social-networking system 160 may identify a set of candidate objects that have higher probability to be relevant to the given search query than the other objects. As an example and not by way of limitation, continuing with the prior examples, the social-networking system 160 may receive a search query "Ariana TV shows." The social-networking system 160 may identify a set of objects as candidate objects such as objects with texts "Lea Michele+ Ariana Grande on the same tv show? We can't wait for this!" and "Ariana Sanchez watching Friends (TV show) at Ariana's home," but not an object with text "Golden State downed the Cleveland Cavaliers 105-97 on Tuesday in Game 6 of the NBA Finals to earn its first championship since 1975." Although this disclosure describes identifying a set of candidate objects on receiving a search query in a particular manner, this disclosure contemplates identifying a set of candidate objects on receiving a search query in any suitable manner.

In particular embodiments, the social-networking system 160 may identify the plurality of objects that contain text in their respective text content that matches one or more of the query terms. As an example and not by way of limitation, the social-networking system 160 may receive a search query "cats acting like humans." The social-networking system 160 may identify objects with text containing any of the terms in the search query. The social-networking system 160 may prioritize the objects based on the number of matching terms in the text of the objects. Although this disclosure describes identifying candidate objects based on partial term matching in a particular manner, this disclosure contemplates identifying candidate objects based on partial term matching in any suitable manner.

The social-networking system 160 may identify a set of candidate objects in other suitable ways. In particular embodiments, the social-networking system 160 may identify a set of candidate objects stored in one or more data stores. The social-networking system 160 may retrieve, for each candidate object, an object match-matrix associated with the candidate object. The social-networking system 160 may compute, for each candidate object, a similarity score representing a degree of similarity between the retrieved object match-matrix for the candidate object and the query match-matrix for the search query by comparing the object match-matrix and the query match-matrix. The social-networking system 160 may identify objects that have the similarity score higher than a threshold. As an example and not by way of limitation, the social-networking system 160 may receive a search query. The social-networking system 160 may generate a reconstructed embedding for the search query by taking an average of the term embeddings in the search match-matrix. The social-networking system 160 may identify a set of candidate objects based on partial term matching as described above. The social-networking system 160 may, for each candidate object, generate a reconstructed embedding for the candidate object by taking an average of the term embeddings in the object match-matrix. The social-networking system 160 may calculate a similarity score between the candidate object and the search query by calculating a cosine similarity between the reconstructed embedding for the candidate object and the reconstructed embedding for the search query. Although this disclosure describes identifying candidate objects for a search query based on similarity between the query match-matrix and the object match-matrix in a particular manner, this disclosure contemplates identifying candidate objects for a search query based on similarity between the query match-matrix and the object match-matrix in any suitable manner.

In particular embodiments, the social-networking system 160 may retrieve, for each identified object, an object match-matrix for the identified object. A first dimension of the object match-matrix may correspond to terms appearing in a text content of the object and a second dimension of the object match-matrix may correspond to n-dimensional embeddings representing the terms in the text content of the object, respectively, in the n-dimensional embedding space. The social-networking system 160 may use the stored link to the object match-matrix to retrieve the object match-matrix. The social-networking system 160 may generate an object match-matrix for the identified object if the identified object does not have a link to the stored object match-matrix. As an example and not by way of limitation, the social-networking system 160 may receive a query "Ariana TV shows" and identify two objects that have text "Lea Michele+Ariana Grande on the same tv show? We can't wait for this!" and "Ariana Sanchez watching Friends (TV show) at Ariana's home." The social-networking system 160 may retrieve object match-matrix for each identified object using the stored link to the respective object match-matrix. As another example and not by way of limitation, the social-networking system 160 may receive a search query "cats acting like humans" and identify a video clip titled "Here are some cats behaving like humans." The social-networking system 160 may generate an object match-matrix for the identified video clip if no object match-matrix exists for the video clip. Although this disclosure describes acquiring an object match-matrix for an identified object for a given query in a particular manner, this disclosure contemplates acquiring an object match-matrix for an identified object for a given query in any suitable manner.

Figure 4:
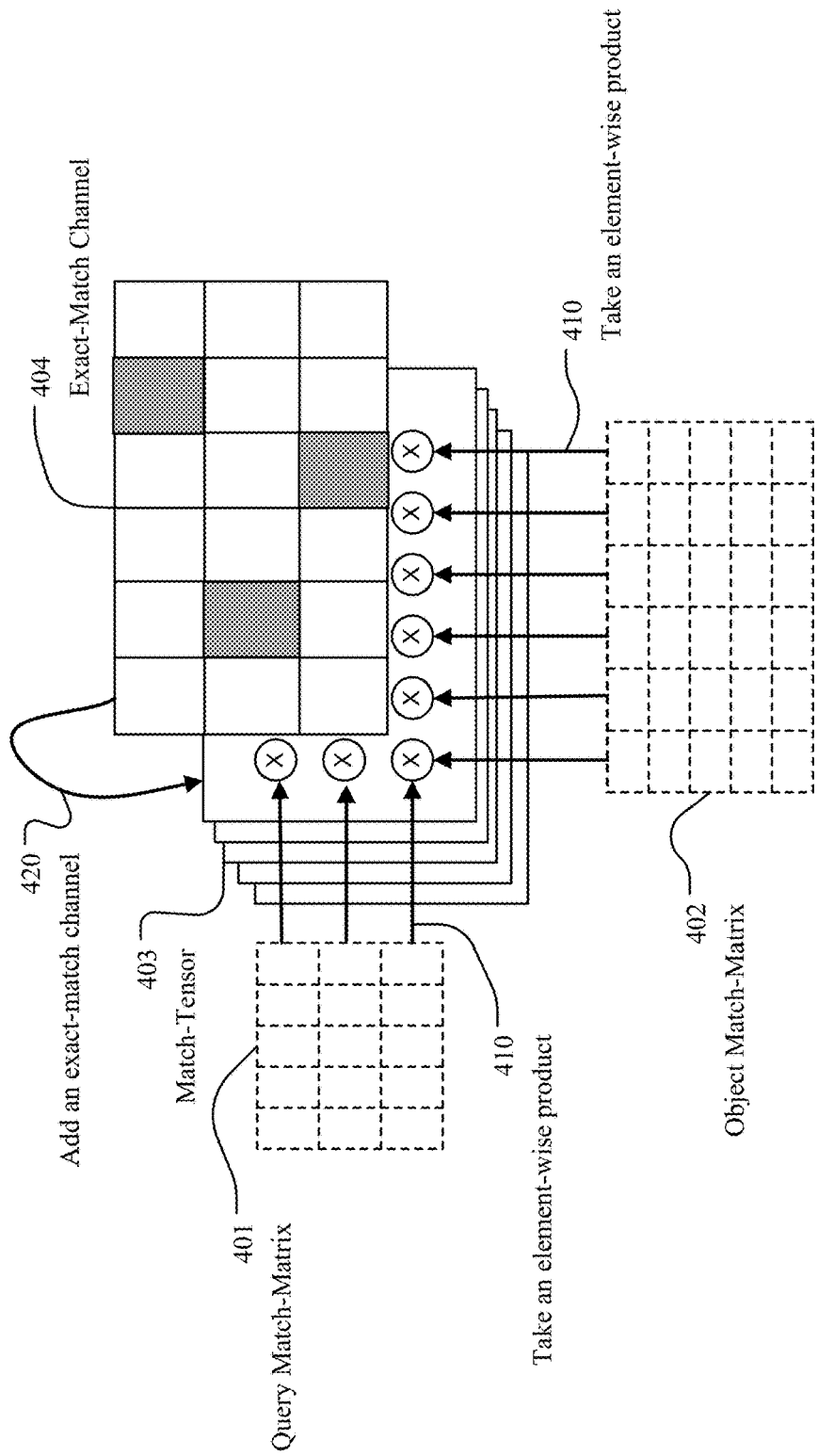
FIG. 4 illustrates an example constructing a Match-Tensor.

FIG. 4 illustrates an example constructing a Match-Tensor. The social-networking system 160 may prepare a query match-matrix 401 for a search query and an object match-matrix 402 for an object in order to construct a Match-Tensor for the query and the object. At step 410, the social-networking system 160 may construct a match-Tensor 403 by taking an element-wise product of the query match-matrix 401 and the object match-matrix 402. For example, when a value of an element (i,j) of the query match-matrix 401 is α and a value of an element (h,j) of the object match-matrix 402 is β, the value of an element (i, h, j) of the Match-Tensor 403 may be α times β. When the size of the query match-matrix 401 is n-by-k and the size of the object match-matrix 402 is m-by-k, where n is the number of terms in the query and m is the number of terms in the text of the object, the size of the Match-Tensor 403 may be n-by-m-by-k. the social-networking system 160 may generate an exact-match channel 404 between the query and the object. An element (i,j) of the exact-match channel 404 may be set to a non-zero value if an i-th term in the search query matches to a j-th term in the text of the object. The element (i,j) may be set to a zero value otherwise. At step 420, the social-networking system 160 may add the exact-match channel 404 to the Match-Tensor 403. The size of the Match-Tensor 403 would be n-by-m-by-(k+1) after adding the exact-match channel 404. Although this disclosure describes constructing a Match-Tensor in a particular manner, this disclosure contemplates constructing a Match-Tensor in any suitable manner.

In particular embodiments, the social-networking system 160 may construct, for each identified object, a three-dimensional tensor called the Match-Tensor 403 for the identified object by taking an element-wise product of the query match-matrix 401 for the search query and the object match-matrix 402 for the identified object. A first dimension of the tensor 403 may correspond to the query terms in the search query, a second dimension of the tensor 403 may correspond to terms appearing in the text content of the object, and a third dimension of the tensor 403 may correspond to the predetermined number of match channels. A match-matrix may comprise a series of term embeddings, where each term embedding may represent the corresponding term in an n-dimensional embedding space. A j-th element in an embedding vector may correspond to a j-th coordinate in the embedding space. Thus, a j-th element in an embedding vector for term i may represent a magnitude of the j-th state-specific signals of term i. A j-th match channel in a Match-Tensor 403 may comprise element-wise products between j-th elements of the query term embeddings within the query match-matrix and j-th elements of the term embeddings with the object match-matrix. Thus, each match channel may calculate a weighted match similarity between the query and the object text, where the weighting for each channel is based on state-specific signals of the query and object text. As an example and not by way of limitation, the social-networking system 160 may identify a video clip object with a title "Here are some cats behaving like humans" on receiving a search query "cats acting like humans." The social-networking system 160 may generate a query match-matrix 401 for the query and an object match-matrix 402 for the identified video clip object. The size of the query match-matrix 401 may be 4-by-50. The size of the object match-matrix 402 may be 7-by-50. The social-networking system 160 may construct a Match-Tensor 403 by taking an element-wise product of the query match-matrix and the object match-matrix. The size of the constructed Match-Tensor 403 may be 3-by-7-by-50. Although this disclosure describes constructing a Match-Tensor in a particular manner, this disclosure contemplates constructing a Match-Tensor in any suitable manner.

In particular embodiments, the social-networking system 160 may append, to each tensor, an exact-match channel. The exact-match channel may present not only matching terms that appear on both query and the object text but also appearance patterns of the matching terms. The social-networking system may capture local textual match based on the exact-match channel. First, the social-networking system 160 may create an exact-match channel for the query and the object. An entry at position (i,j) of the exact-match channel may be set to a non-zero value if an i-th term in the search query is an exact match to a j-th term in the text of the object and may be set to a zero value otherwise. The social-networking system 160 may append the generated exact-match channel to the Match-Tensor. As an example and not by way of limitation, continuing with the prior example, the social-networking system 160 may generate an exact-match channel for the query "cats acting like humans" and the text contents of the object (e.g., title in this example) "Here are some cats behaving like humans." Elements (1, 4), (3, 6), and (4, 7) of the exact-match channel may be set to a non-zero value while the other elements may be set to a zero value. The social-networking system 160 may append the generated exact-match channel to the constructed Match-Tensor 403. Although this disclosure describes appending an exact-match channel to a Match-Tensor in a particular manner, this disclosure contemplates appending an exact-match channel to a Match-Tensor in any suitable manner.

In particular embodiments, the social-networking system 160 may determine the non-zero value for an entry in the exact-match channel through a backpropagation process. The goal of the backpropagation process may be optimizing the non-zero value so that a relevance score based on the Match-Tensor architecture can represent a degree of relevance of an object for a given search query. For the backpropagation process, the social-networking system 160 may prepare training data. The training data may comprise a set of a plurality of pairs of a search query and an object and their respective match-matrices. A desired relevance score for each pair may be known. The social-networking system 160 may set an arbitrary value to the non-zero value. The social-networking system 160 may perform an iterative process for a number of iterations. The number of iterations may be greater or equal to the number of the pairs. The social-networking system 160 may, as a first step of the iterative process, select a pair of a search query and an object in order from the prepared set. The social-networking system 160 may, as a second step of the iterative process, construct a three-dimensional tensor by taking an element-wise product of the query match-matrix for the selected search query and the object match-matrix for the selected object. The social-networking system 160 may, as a third step of the iterative process, compute a relevance score based on the tensor for the selected pair. The social-networking system 160 may, as a fourth step of the iterative process, compare the computed relevance score with the known desired relevance score. The social-networking system 160 may, as a fifth step of the iterative process, adjust the non-zero value based on the comparison. The social-networking system 160 may repeat the iterative processes until the difference between the computed relevance score and the known desired relevance score is within a predetermined value for all the prepare pairs. Although this disclosure describes a particular example backpropagation process, this disclosure contemplates any backpropagation process for training a neural network. Although this disclosure describes determining the non-zero value for an entry in the exact-match channel in a particular manner, this disclosure contemplates determining the non-zero value for an entry in the exact-match channel in any suitable manner.

In particular embodiments, the social-networking system 160 may compute, for each identified object, a relevance score based on the tensor for the identified object, where the relevance score may represent a degree of relevance between the search query and the object. The social-networking system 160 may employ a downstream neural network to compute the relevance score. As an example and not by way of limitation, the social-networking system 160 may compute a relevance score based on a Match-Tensor 403 for a query and an object by providing the Match-Tensor 403 as an input to a convolutional neural network. Although this disclosure describes computing a relevance score based on a Match-Tensor in a particular manner, this disclosure contemplates computing a relevance score based on a Match-Tensor in any suitable manner.

Figure 5:
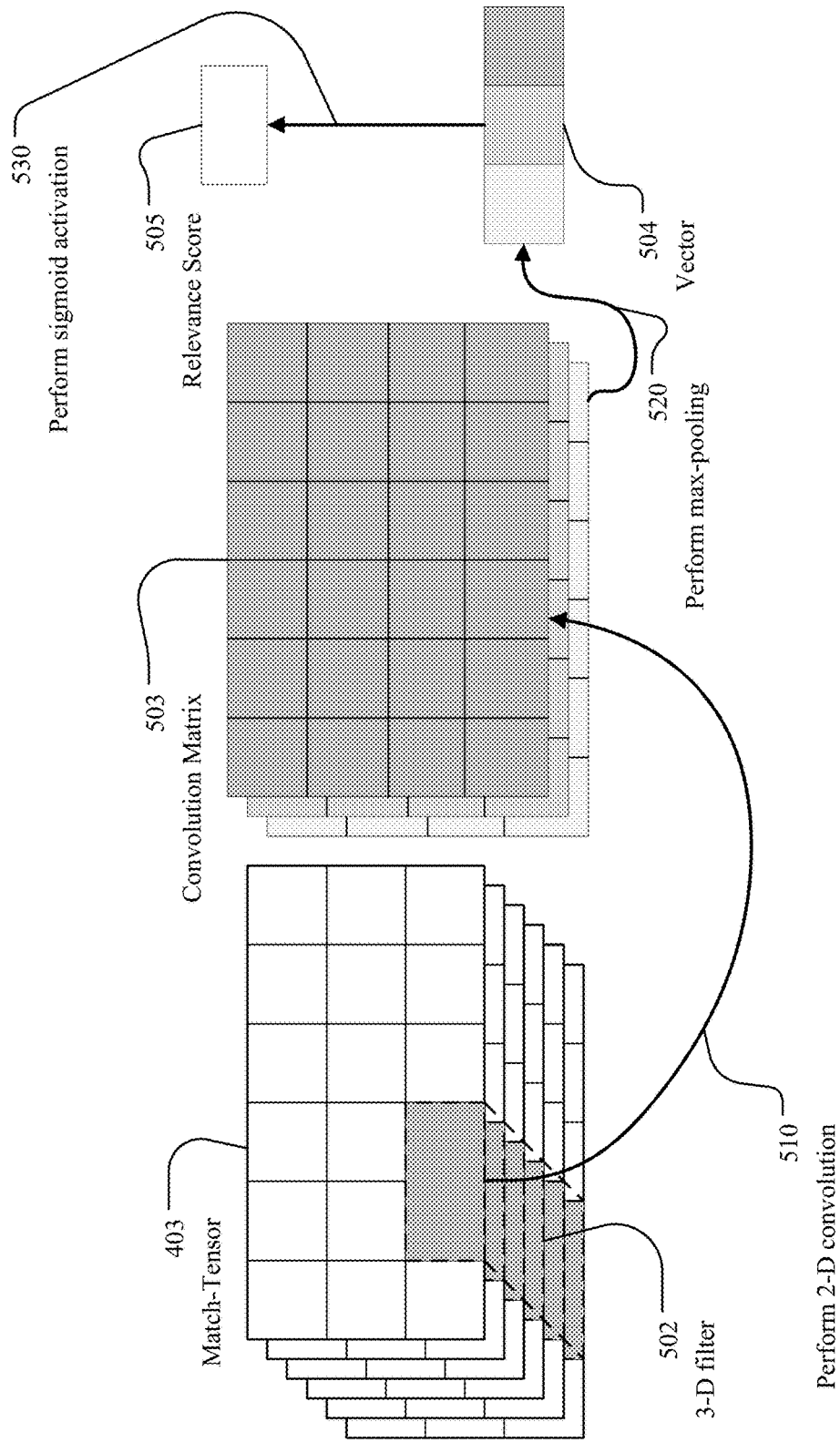
FIG. 5 illustrates an example computing a relevance score based on a Match-Tensor.

FIG. 5 illustrates an example computing a relevance score based on a Match-Tensor. The social-networking system 160 may employ a convolutional neural network as the downstream neural network. This example illustrates a simplified version of computing the relevance score. At step 510, the social-networking system 160 may perform two-dimensional convolutions with a plurality of three-dimensional filters 502 on the given Match-Tensor 403. The depth of the three-dimensional filters 502 may be identical to the depth of the Match-Tensor 403. The results of the convolutions may be set to the convolution matrix 503 in which a convolution layer may comprise convolution results with a filter 502. The number of convolution layers in the convolution matrix 503 may correspond to the number of filters 502 used for convolutions. At step 520, the social-networking system 160 may generate a vector 504 called fully-connected layer by performing max-pooling on the convolution matrix 503. At step 530, the social-networking system 160 may compute a relevance score 505 by performing sigmoid activation on the fully-connected layer 504. The relevance score 505 may be a real number between 0 and 1. Although this disclosure describes computing a relevance score based on a Match-Tensor in a particular manner, this disclosure contemplates computing the relevance score based on the Match-Tensor in any suitable manner.

In particular embodiments, the social-networking system 160 may generate a first three-dimensional matrix by performing a first series of convolutions on the tensor with one or more sets of first-convolution filters. Each of the one or more sets of the first-convolution filters comprises a plurality of n-by-m-by-k first-convolution filters, where n is a first dimension size of the filter, m is a second dimension size of the filter, and k is a third dimension size of the filter. The first dimension of a first-convolution filter may correspond to the query terms. The second dimension of the filter may correspond to the terms in the text content of the object. The third dimension of the filter may correspond to the match channels. The size of the third dimension k may be equal to the number of match channels of the tensor. In particular embodiments, the social-networking system 160 may apply a Rectified Linear Unit (ReLU) activation function to the first three-dimensional matrix. An ReLU activation function may be an element-wise activation function. As an example and not by way of limitation, the social-networking system 160 may generate a first three-dimensional convolution matrix by performing a series of convolutions with first-convolution filters of various sizes: 3-by-3-by-k, 3-by-4-by-k, and 3-by-5-by-k. The third dimension of the first convolution matrix may correspond to convolution layers, where the number of the convolution layers of the first convolution matrix may be equal to the number of used first-convolution filters. The social-networking system 160 may apply an ReLU activation function $x = \max(0, x)$ on each element of the first convolution matrix, where x is a value of an element. Although this disclosure describes generating a first convolution matrix in a particular manner, this disclosure contemplates generating a first convolution matrix in any suitable manner.

In particular embodiments, the social-networking system 160 may generate a second three-dimensional matrix by performing a second series of convolutions with a plurality of second-convolution filters on the first three-dimensional matrix. A size of the second-convolution filters may be 1-by-1-by-k', where k' may be equal to a size of a third dimension of the first three-dimensional matrix. The third dimension of the first three-dimensional matrix may correspond to convolution layers, where each convolution layer may comprise output of convolutions with a particular first-convolution filter. A third dimension of the second three-dimensional matrix may correspond to convolution layers, where each convolution layer may comprise output of convolutions with a particular second-convolution filter. The social-networking system 160 may apply an ReLU activation function on the second three-dimensional matrix. As an example and not by way of limitation, the social-networking system 160 may have a 20-by-80-by-18 first convolution matrix. The social-networking system 160 may generate a 20-by-80-by-20 second convolution matrix by performing a series of convolutions with 20 second convolution filters of size 1-by-1-by-18. The social-networking system 160 may apply an ReLU activation function on the second convolution matrix. Although this disclosure describes generating a second convolution matrix in a particular manner, this disclosure contemplates generating a second convolution matrix in any suitable manner.

In particular embodiments, the social-networking system 160 may construct a vector of a predetermined size by performing a max-pooling procedure on the second three-dimensional matrix. The social-networking system 160 may prepare memory space for the vector. The size of the vector may be equal to the number of the convolution layers on the second three-dimensional matrix. In particular embodiments, the social-networking system 160 may choose, as a first step of the max-pooling procedure, for each convolution layer of the third three-dimensional matrix, a maximum value. In particular embodiments, the social-networking system 160 may fill, as a second step of the max-pooling procedure, a corresponding element of the vector with the chosen value. As an example and not by way of limitation, the social-networking system 160 may have a 20-by-80-20 second convolution matrix. The social-networking system 160 may prepare a memory space for a vector of size 20. The social-networking system 160 may choose a maximum value from each convolution layer on the second convolution matrix and fill the value to the corresponding element of the vector. Although this disclosure describes generating a vector using a max-pooling procedure in a particular manner, this disclosure contemplates generating a vector using a max-pooling procedure in any suitable manner.

In particular embodiments, the social-networking system 160 may calculate a relevance score by performing a sigmoid activation on the vector. The sigmoid activation on the vector may produce a real-number score between 0 and 1. As an example and not by way of limitation, continuing with the prior example, the social-networking system 160 may produce a relevance score of 0.67 by performing a sigmoid activation on the vector that was generated by max-pooling procedure. Although this disclosure describes calculating a relevance score from a vector in a particular manner, this disclosure contemplates calculating a relevance score from a vector in any suitable manner.

Figure 6:
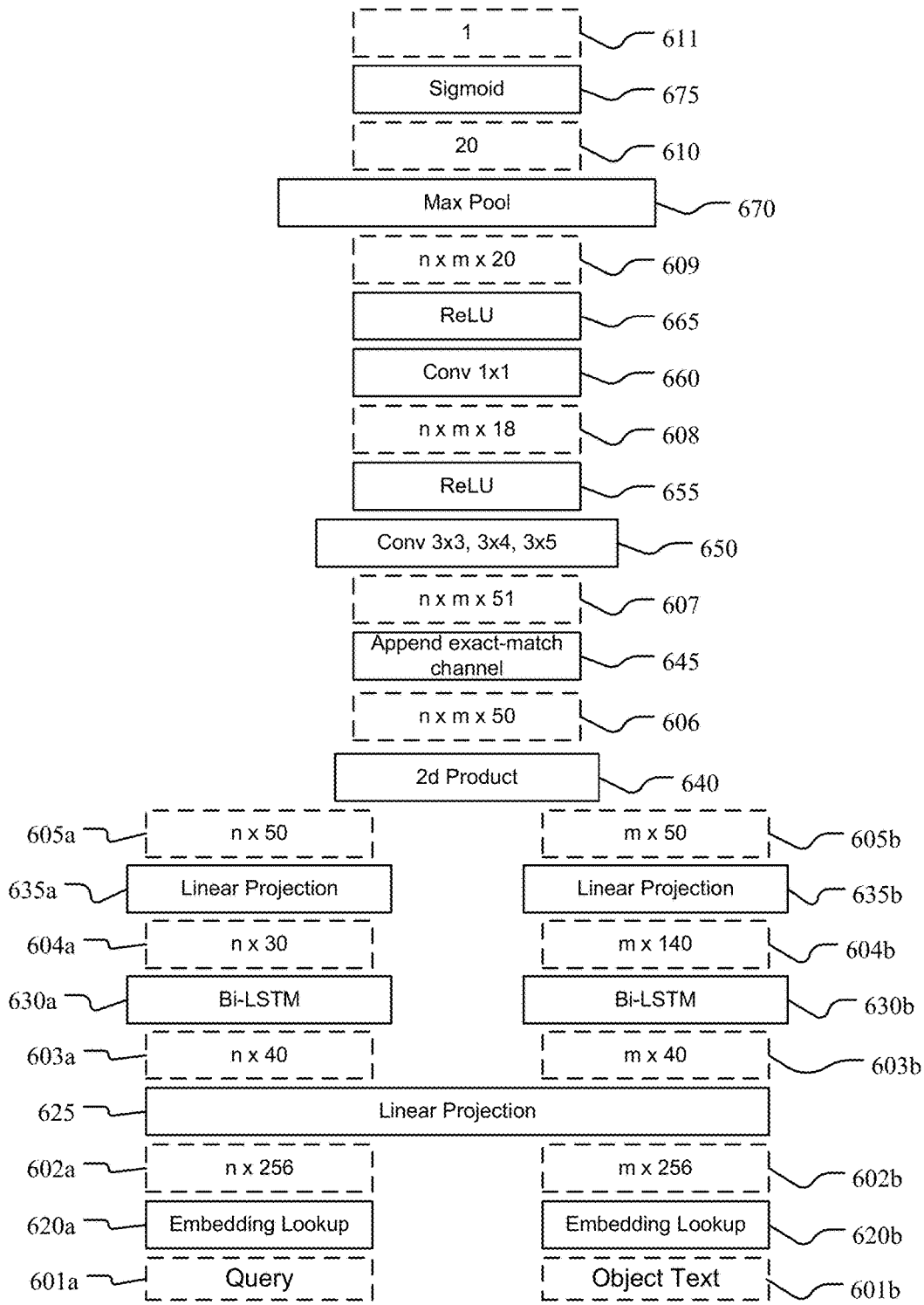
FIG. 6 illustrates an example process of computing a relevance score of an object for a query with the Match-Tensor model.

FIG. 6 illustrates an example process of computing a relevance score of an object for a query with the Match-Tensor model. The procedures illustrated in this figure is an example, and actual procedure may vary. Dashed-boxes in the figure represent input or output of procedures while solid-boxes in the figure represent procedures. At step 620*a*, the social-networking system 160 may generate query term-embeddings 602*a* by looking up the query terms 601*a* in the word-embedding table. At step 625, the social-networking system 160 may perform linear projection on the query term-embeddings 602*a* to transform the query term-embeddings 602*a* into a reduced query term-embeddings 603*a*. At step 630*a*, the social-networking system 160 may encode the reduced term-embeddings 603*a* with a bi-LSTM network to produce a query match-matrix 604*a*. At step 635*a*, the social-networking system 160 may adjust the size of the query match-matrix 604*a* by performing a linear projection on the query match-matrix 604*a* and produce an adjusted query match-matrix 605*a*. The size of the adjusted query match-matrix 605*a* may be n-by-50 where n is the number of query terms. The social-networking system 160 may generate an adjusted object match-matrix 605*b* for a given object text 601*b* by following similar procedures. The size of the second dimension of the query match-matrix 605*a* and the size of the second dimension of the object match-matrix 605*b* are identical. At step 640, the social-networking system 160 may construct a three-dimensional first tensor 606 by taking an element-wise product of the query match-matrix 605*a* and the object match-matrix 605*b*. At step 645, the social-networking system 160 may produce a second tensor 607 by appending an exact-match channel to the first tensor 606. At step 650, the social-networking system 160 may performing a series of convolutions with three different sets of first convolution filters on the second tensor 607 to create a first convolution matrix 608. First set of first convolution filters may comprise filters of size 3-by-3-by-51. Second set of first convolution filters may comprise filters of size 3-by-4-by-51. Third set of first convolution filters may comprise filters of size 3-by-5-by-51. At step 655, the social-networking system 160 may apply an ReLU activation function on the first convolution matrix 608. At step 660, the social-networking system 160 may generate a second convolution matrix 609 by performing a second series of convolutions with 1-by-1-18 second convolution filters. At step 665, the social-networking system 160 may apply an ReLU activation function on the second convolution matrix 609. At step 670, the social-networking system 160 may create a vector 610 by performing max-pooling on the second convolution matrix 609. At step 675, the social-networking system 160 may produce a relevance score 611 by performing sigmoid activation on the vector 610.

In particular embodiments, the social-networking system 160 may rank the identified objects based on their respective relevance scores. The social-networking system 160 may sort the identified objects based on the corresponding relevance scores. The order of the objects may be the rank of the objects. As an example and not by way of limitation, the social-networking system 160 may have computed the relevance scores for all the identified objects. The social-networking system 160 may then rank the objects by sorting the objects with the computed relevance scores of the objects. The social-networking system 160 may rank an object with the highest score first and may rank another object with the next highest score second, and so on. Although this disclosure describes ranking the objects in a particular manner, this disclosure contemplates ranking the objects in any suitable manner.

In particular embodiments, the social-networking system 160 may send, to the first client system 130 in response to the search query, instructions for generating a search-results interface for presentation to the first user, the search-results interface comprising references to one or more of the identified objects presented in ranked order. The search-results interface may comprise references to one or more of the objects presented in ranked order. The client system 130 may generate a search-results interface and may present the interface to the querying user as a response to the query request. In particular embodiments, the interface may include the contents of the high-ranking objects and may allow the user to navigate to the lower ranking posts. In particular embodiments, the interface may comprise a list of object titles along with hypertext links to the objects and an interface to allow the user to navigate through the objects. As an example and not by way of limitation, the social-networking system 160 may send an HTTP response with instructions for generating a search-results interface to a client system 130. On receiving the HTTP response from the social-networking system 160, the client system 130 may present a search-results page on the web browser. The interface may comprise references to a number of the high-rank objects. The user may be able to navigate towards the lower ranking objects. Although this disclosure describes providing search results in a particular manner, this disclosure contemplates providing search results in any suitable manner.

Figure 7:
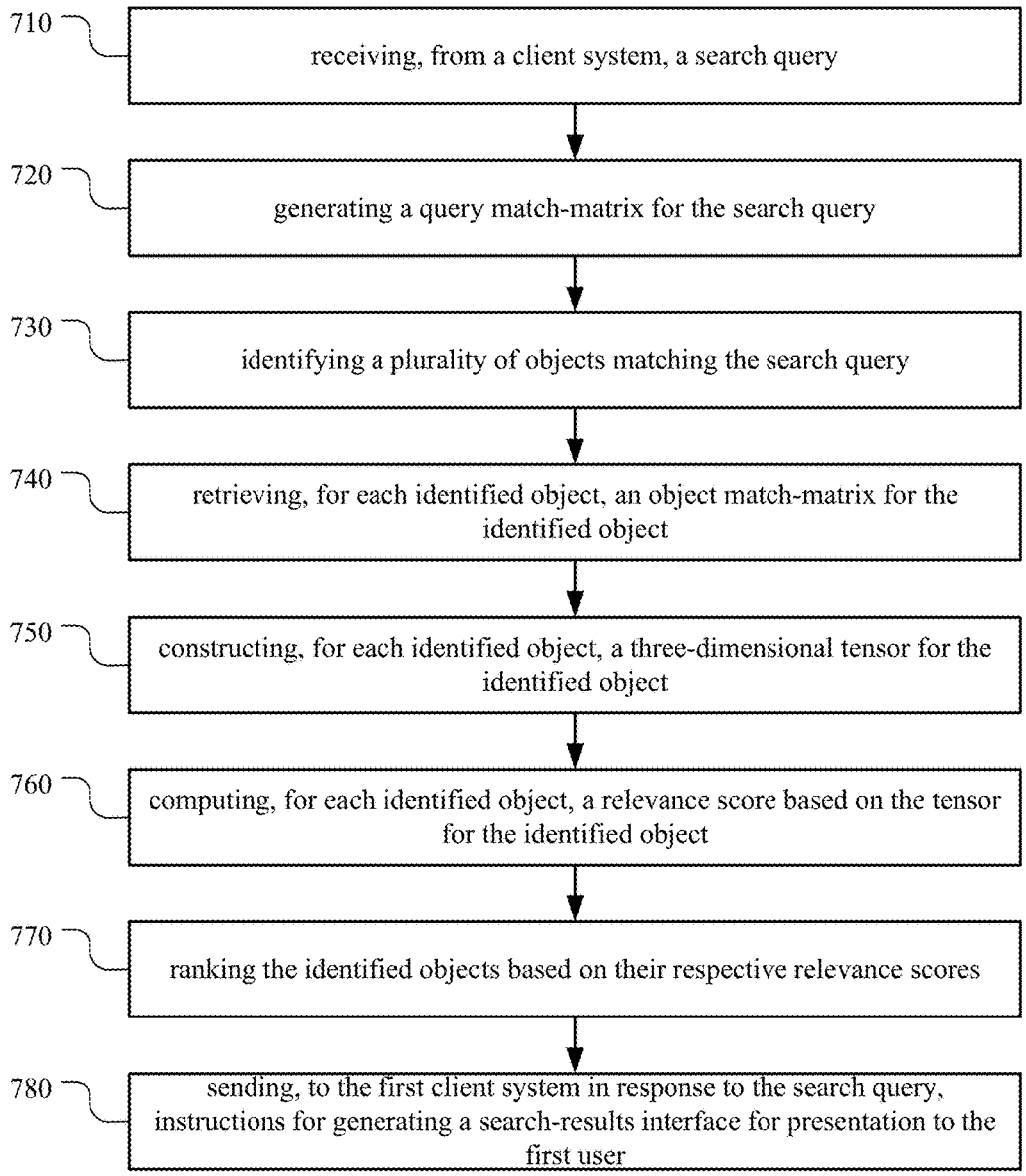
FIG. 7 illustrates an example method for presenting query results based on a deep relevance model.

FIG. 7 illustrates an example method for presenting query results based on a deep relevance model. The method may begin at step 710, where the social-networking system 160 may receive, from a client system, a search query comprising a plurality of query terms. At step 720, the social-networking system 160 may generate a query match-matrix for the search query, wherein a first dimension of the query match-matrix corresponds to the query terms in the search query and a second dimension of the query match-matrix corresponds to n-dimensional embeddings representing the query terms in the search query, respectively, in an n-dimensional embedding space. At step 730, the social-networking system 160 may identify a plurality of objects matching the search query. At step 740, the social-networking system 160 may retrieve, for each identified object, an object match-matrix for the identified object, wherein a first dimension of the object match-matrix corresponds to terms appearing in a text content of the object and a second dimension of the object match-matrix corresponds to n-dimensional embeddings representing the terms in the text content of the object, respectively, in the n-dimensional embedding space. At step 750, the social-networking system 160 may construct, for each identified object, a three-dimensional tensor for the identified object by taking an element-wise product of the query match-matrix for the search query and the object match-matrix for the identified object, wherein a first dimension of the tensor corresponds to the query terms in the search query, a second dimension of the tensor corresponds to terms appearing in the text content of the object, and a third dimension of the tensor corresponds to the predetermined number of match channels, wherein each match channel calculates a weighted match similarity between the query and the object text, wherein the weighting for each channel is based on state-specific signals of the query and object text. At step 760, the social-networking system 160 may compute, for each identified object, a relevance score based on the tensor for the identified object, wherein the relevance score represents a degree of relevance between the search query and the object. At step 770, the social-networking system 160 may rank the identified objects based on their respective relevance scores. At step 780, the social-networking system 160 may send, to the first client system in response to the search query, instructions for generating a search-results interface for presentation to the first user, the search-results interface comprising references to one or more of the identified objects presented in ranked order. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for presenting query results based on a deep relevance model including the particular steps of the method of FIG. 7, this disclosure contemplates any suitable method for presenting query results based on a deep relevance model including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

The central thesis of the Match-Tensor architecture is that incorporating multiple notions of similarity is vital, capturing both immediate and larger contexts in a given document when computing the relevance of the document to a query. This objective may be achieved by a three-dimensional tensor, in which one dimension corresponds to terms in the query, one dimension for the terms in the document, and a third dimension for various match channels. Each match channel may contain a distinct estimate of the match similarity between the query and document, hence the tensor is named "Match-Tensor." The tensor may be computed using the output of a neural network operating on word-embeddings and may be supplemented with an exact-match channel that may operate directly on the tokens; a downstream neural network may then be employed to determine the relevance of the document to the query using the tensor. The entire network may be trained end-to-end with a discriminative objective. Thus, the manner in which these multiple notions of similarity are combined to produce the final relevance score may be deferred until after all channels are computed.

Input to the Match-Tensor Layer:

To begin, a word-embedding lookup layer may convert query and document terms into separate sequences of word-embeddings. The word-embedding table may be itself computed offline from a large corpus of social media documents using the word2vec package [30] in an unsupervised manner and may be held fixed during the training of the Match-Tensor network. In particular embodiments, word-embeddings may be 256-dimensional vectors of floating point numbers. The word embeddings may be then passed through a linear projection layer to a reduced l-dimensional space (e.g., l=40); the same linear projection matrix may be applied to both the query and the document word vectors. This linear projection may allow the size of the embeddings to be varied and tuned as a hyperparameter without relearning the embeddings from scratch each time. Two Recurrent Neural Networks, specifically bi-directional LSTMs (bi-LSTMs) [11, 16] may then encode the query (respectively document) word-embedding sequence into a sequence of LSTM states. The bi-LSTM states may capture separate representations in vector form of the query and the document, respectively, that may reflect their sequential structure, looking beyond the granularity of a word to phrases of arbitrary size. During hyperparameter tuning, the models may use a linear projection layer inside the bi-LSTM recurrent connection, as defined in Sak et al. [38]. In particular embodiments, a separate linear projection after the bi-LSTM to establish the same number k of dimensions in the representation of query and document (e.g., k=50) may be applied. Thus, at the end, each token in the query and the document may be represented as a k-dimensional vector.

Match-Tensor Layer:

For m words in the query and n words in the document, the actual match-tensor—from which the architecture inherits its name—may be an m× n× k+1 tensor, where k+1 is the number of channels in the match-tensor. Each of the k+1 channels may be computed from a distinct representation of the query and document: all but one of the channels may be computed using the element-wise product of the corresponding bi-LSTM states of the query and document (after applying the subsequent projection). Including each dimension as a separate layer instead of collapsing them into a single layer may allow the model to include state-specific (approximately: term-specific) signals in the matching process and to weigh matching different terms according to their importance. While this approach may capture most of the key signals, one omission of the first k layers may be their inability to properly represent out-of-vocabulary tokens in the query or document, beginning in the initial word embedding lookup. To compensate for this problem, the initial embedding lookup may include an out-of-vocabulary vector, and the model may append an extra exact-match channel in the match-tensor (hence, k+1 total channels) such that the entry at position (i,j) of this channel may be set to $\alpha$ if word i in the query is an exact match to word j in the document and zero otherwise. This exact-match channel may be critical for capturing local textual match. The value of a may be learned via back-propagation along with the rest of the model.

From Match-Tensor to Score:

The secondary neural network may begin with the match-tensor and may apply a convolutional layer. In particular embodiments, the match-tensor may be convolved cross the full depth (k+1) of the tensor with three sets of filters, each having a width of three query words and a height of three, four, or five document words. These 3-D convolution filters may enable the model to learn interactions among the representations in ways that would be very difficult to anticipate as a feature engineer, lending expressive strength to the model architecture. In particular embodiments, the model may apply a ReLU (rectified linear unit) function to the output of these convolutions and then may convolve that output with a set of 1×1 filters. The ReLU activation function was chosen because it has been shown to be effective for convolutional neural networks in computer vision [18]. Finally, the model may apply 2-D max-pooling to coalesce the peaks from the ReLU into a single fixed size vector. This may be fed into a fully-connected layer and through a sigmoid to produce a single probability of relevance on the output of the model.

Additional Related Work

Using Deep Neural Networks in Search is being widely studied [7, 17, 19, 31, 33, 40, 41, 44]. The Match-Tensor based Deep Relevance Model for search is closest to the so-called Match Pyramid models of Pang et al. [35, 36]: The Match Pyramid models construct a single match matrix and then use a convolutional network on top of it (hence "pyramid") to compute a relevance score. Unlike them, the Match-Tensor architecture may simultaneously consider multiple channels during the matching process allowing for a rich interplay between the different channels in determining the relevance of an object to a query. The Match Pyramid models are unable to distinguish between different words having the same match pattern. Guo et al. [14] developed a neural-network based model (DRMM) that uses matching histograms and term-gating. According to Guo et al., DRMM is more accurate than BM25 and other alternatives on standard TREC test collections (Robust-04 and ClueWeb-09-Cat-B). However, Mitra et. al [32] report that a model incorporating an exact-match channel with a representation based "distributed" model outperforms DRMM on a larger collection of web-search queries.

Diaz et al. [8] propose a model to use word-embeddings in query expansions. Ganguly et al. [10] propose to use word-embeddings in smoothing language models. Nalisnick et al. [33] propose dual embeddings, and Grbovic et al. [12, 13] use word-embeddings in sponsored search. Cohen et al. [6] have also studied the utility of DNNs for several IR tasks.

Methodology

Evaluations on the Match-Tensor based Deep Relevance Model are performed by comparing the performance of the Match-Tensor model with other alternative models in a set of experiments. The details of the used models and experiments are below.

Data:

Approximately 1.6 million (query, document, label) triplets are collected on a major social media site between 2016-01-01 and 2016-06-01 for experiments. Each document is a publicly viewable social media post, which might include videos, photos, and links, as well as text, but for the experiments, only posts with text are considered. Labels indicate the relevance level of the document with respect to the query. Three levels of relevance are used for the experiments: "VITAL", "RELEVANT", and "NONRELEVANT". The dataset is split (by query) into three parts: train, validation, and test, so that each query string appears in exactly one of the partitions. Details of the partitioning is provided in table 1. The training and validation sets were used to train the models and perform hyper-parameter sweeps. The test set was used only for evaluation, at the end of this process.

TABLE 1

Details of Dataset

| | Unique Queries | Results | Average Results/Query |
| --- | --- | --- | --- |
| Train | 59457 | 1032325 | 17.36 |
| Validation | 3975 | 69005 | 17.36 |
| Test | 35773 | 615242 | 17.20 |

Implementation Details:

TensorFlow [1] is used to implement the Match-Tensor neural network model. Pre-trained 256-dimensional phrase embeddings using the word2vec package [29] on a large corpus of documents with a vocabulary size of around 2 million tokens containing unigrams and selected bigrams are used. Out-of-vocabulary words are mapped to a special token. Queries are truncated to a maximum of eight words in length, whereas documents are truncated to a maximum length of 200 words. Both the query and the documents are then preprocessed by lowercasing and applying a simple tokenizer to split words and remove punctuation. Because social media documents are structured into separate fields (e.g., the title, author, and body), special tokens for demarcating the boundaries between fields and for the start and end of a document are added. The embeddings for these special boundary tokens are randomly initialized and kept fixed during training. Dropout is used as a regularizer on the non-recurrent connections of all bi-LSTMs. The Adam optimizer for gradient descent [20] with a learning rate of 0.001 and mini-batch size of 200 is employed. Hyperparameter settings are shown in Table 2. Experiments with alternative choices for these components and alternate architectures were conducted to investigate the importance of each of the major components in the model. The alternate architectures were tailored for social media documents. While a number of architectures have been suggested for short text common in some social media [26, 36], Pang et al. [35] indicate that the suggested architectures do not outperform baseline models such as BM25. In contrast, both early models [17, 41] and recent developments by Mitra et al. that has shown strong performance [31] have been designed for web-search and are not directly usable for social media documents. These model architectures were adapted from web search for social media document search.

Figure 8:
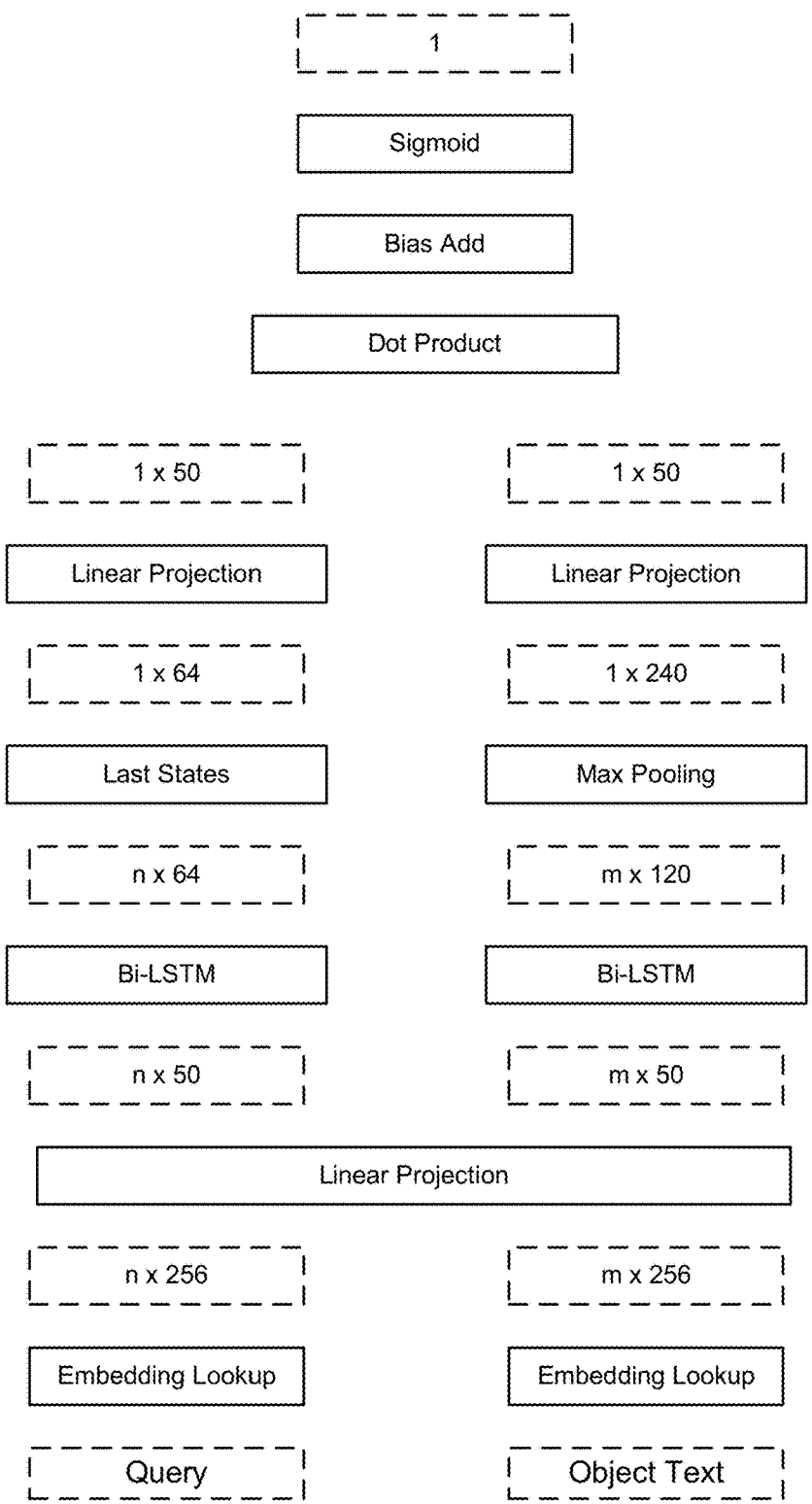
FIG. 8 illustrates an example process of computing a relevance score of a document for a query with SSM model.

Semantic Similarity Model (SSM):

A model using the siamese network architecture based on the Semantic Similarity Models (SSM) appearing in other work [17, 34, 41] has been constructed. Detailed procedure for the SSM model is shown in FIG. 8. A query embedding is constructed by concatenating the last output from each of the forward and backward directions of the query bi-LSTM. A document embedding is constructed by max-pooling over the output bi-LSTM states across the entire document. Max-pooling is used for the document because the documents can be much longer than the query, and propagating the relevant information all the way to the end of the document is harder for the bi-LSTM [22]. These fixed-length document and query embeddings are then passed through linear projections before computing a dot-product between the document and query embeddings. The result of the dot-product is then used to compute the final score. The model parameters and hyper-parameters were optimized on the same dataset as the Match-Tensor model.

Figure 9:
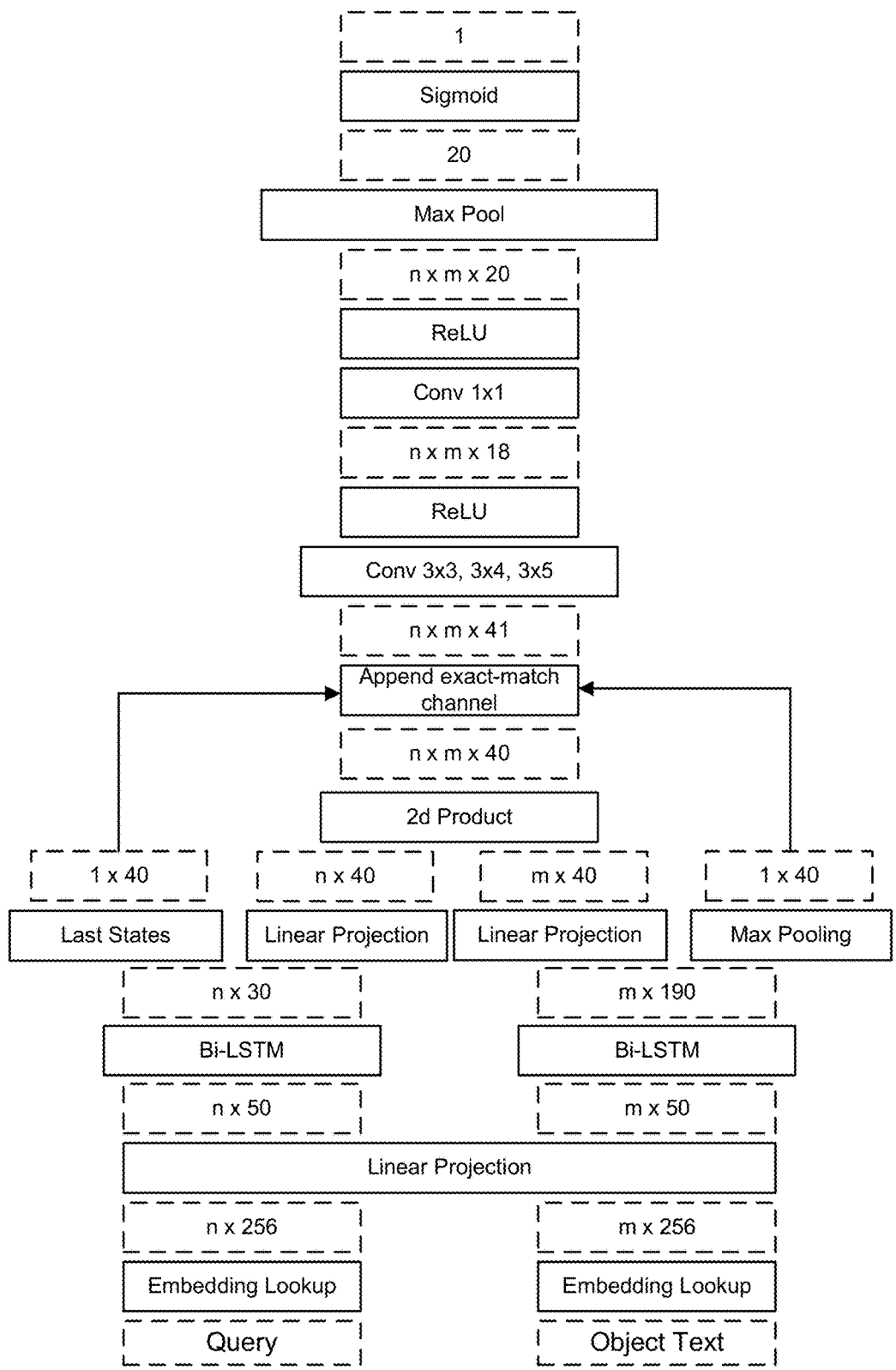
FIG. 9 illustrates an example process of computing a relevance score of a document for a query with the Match-Tensor+SSM model.

Match-Tensor (Exact-Only)+SSM:

Mitra et al. [32] show that a combination of local and distributed matching can outperform other models for web-search. Because a number of details of their model are specific to the structure of web documents, an adapted model for social media document search was constructed for the experiments. The adapted model has similar characteristics for the settings by combining a single channel exact-match only Match-Tensor component with an SSM component into a single model. The adapted model is constructed by concatenating the output from the last layer of the Match-Tensor filters with the hidden layer of the SSM comparison network as shown in FIG. 9. The Match-Tensor and SSM components share parameters for the word embedding and LSTM portion of the model.

Match-Tensor+SSM:

The effect of utilizing all the channels in the Match-Tensor architecture in conjunction with the SSM architecture is also compared. This model is shown in FIG. 9. The only difference in architecture between this model and the previous (exact-match only channel) model is the number of channels in the tensor layer: the former has one channel while this model has k+1 like the Match-Tensor model.

bi-LSTMs vs. CNNs:

All three model architectures mentioned above are compared against similar ones that uses convolutional layers in-place of bi-LSTMs. A mix of width 1 and width 3 convolutional filters is used. Compared to the bi-LSTMs, that can incorporate information over a wide token span, the representations produced by the convolutional filters only look at trigrams (when the width is 3) but are computationally cheaper.

Attention Pooling:

To improve on the query-agnostic pooling schemes of SSM, an attention pooling mechanism for the document embeddings as an alternative to max pooling is implemented. The underlying hypothesis for this approach is that information from the query is important in deciding in how to summarize the document. The attention pooling model learns a ReLU activated transformation from the query embedding and each output from the document bi-LSTM. Attention weights are determined by taking the dot product between these vectors and normalized using the Softmax function. The attention-pooled document embedding is the weighted combination of the bi-LSTM outputs. The use of attention in these experiments is different from that of Palangi et al. [45] where attention-based pooling was used in a query-agnostic manner. Using attention-based pooling did not result in improved results compared to a max pooling baseline in the preliminary experiments. Thus, no further experiments have been conducted for the attention pooling.

Ensemble Models:

Comparing different model architectures using absolute metrics can yield insight into the relative importance of the types of signals for the task at hand. However, one model might outperform another model without capturing the signal in the latter model. Consequently, to test if one model subsumes another, additional ensemble models that use the scores of both models are trained. The accuracy of the ensemble models in addition to the individual models are measured.

Results

Model Selection:

Hyperparameters optimization has been done based on a random grid search on the validation set for each studied model architecture, selecting the one model with the best score out of 200 runs. For each model architecture, the single best model on the test set was evaluated. Table 2 reports these hyperparameters for the three main model architectures. The final Match-Tensor model has fewer parameters than the final SSM model.

TABLE 2

Hyperparameter settings for each model architecture

|  | SSM | Match-Tensor | Match-Tensor + SSM |
| --- | --- | --- | --- |
| Word Embedding Projection | 50 | 40 | 50 |
| Doc. bi-LSTM Dim. | 120 | 70 | 95 |
| Query bi-LSTM Dim. | 32 | 15 | 15 |
| Comparison Net Hidden Layer | 50 | 50 | 55 |
| Match-Tensor Size | — | 40 | 35 |
| Match Filters 1st Layer | — | 18 | 18 |
| Match Filters 2nd Layer | — | 20 | 30 |
| Training Epochs | 4.25 | 4.5 | 3.25 |
| Total Parameters | 216K | 104K | 160K |

Figure 10:
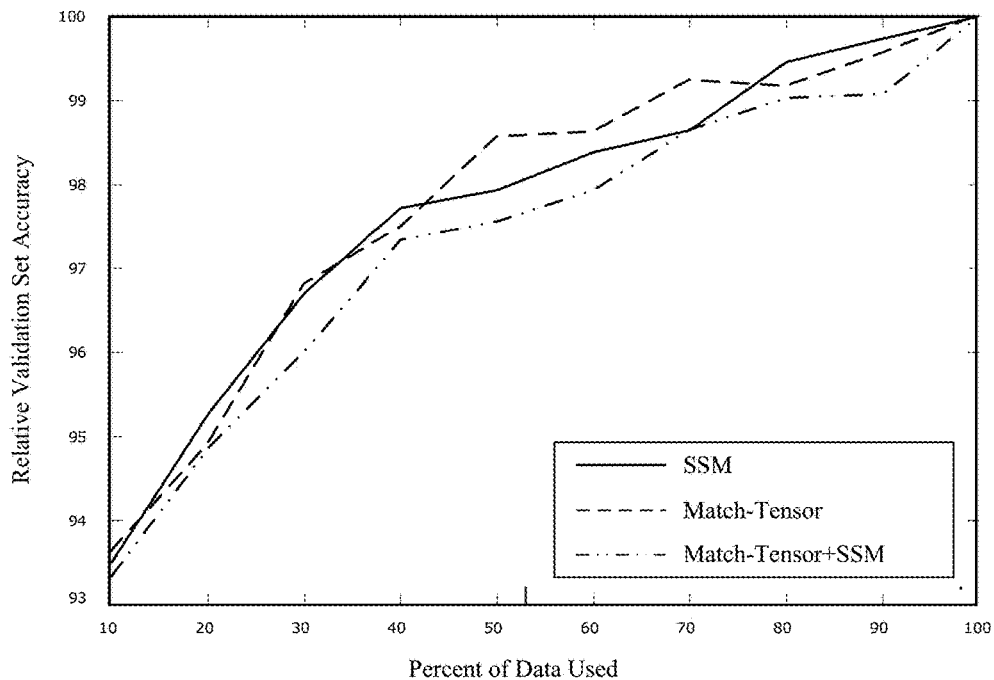
FIG. 10 illustrates test-accuracy as a function of size of training set for each model, relative to test-accuracy of model trained with all data.

Sensitivity to Training Size:

To evaluate the sensitivity of the model performance to the amount of training data, for each of the NN architectures we sub-sampled the training set, retrained models (keeping the hyperparameters fixed), and computed the test-loss. FIG. 10 shows the test loss of each model as a function of its final accuracy. Each considered architecture benefits from the availability of large training sets, and the accuracy improves substantially as the size of the training set increases. However, the relative comparisons between the model architectures appear to be reasonably robust to training data size.

Figure 11:
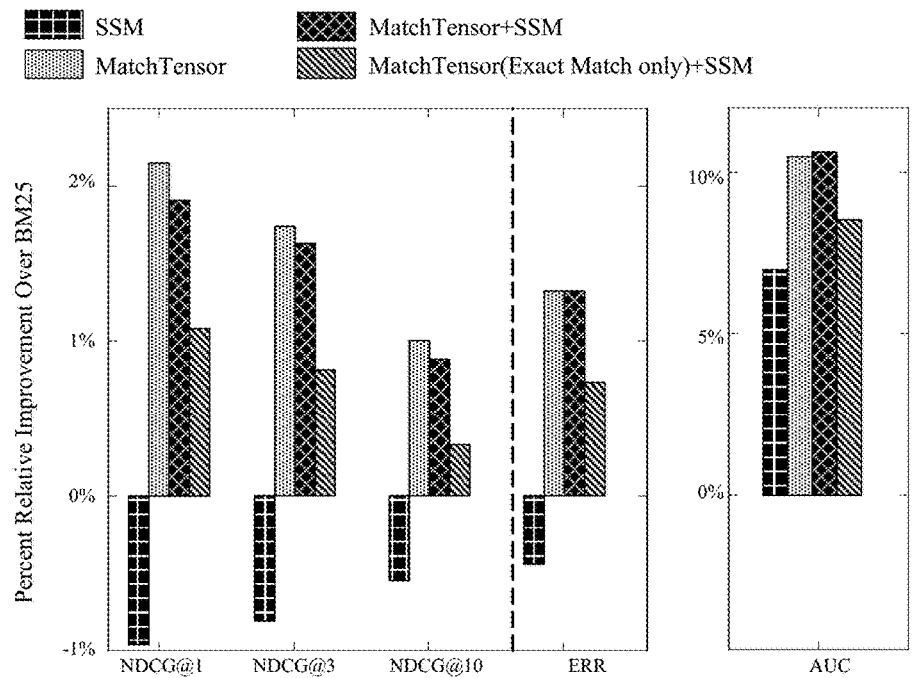
FIG. 11 illustrates accuracy of different model architecture relative to BM25 in percentage.

Performance of Neural Models:

FIG. 11 summarizes the performance of the various neural model architectures relative to a BM25 baseline. The figure reports Normalized Discounted Cumulative Gain (NDCG) at various levels as well as Expected Reciprocal Rank (ERR) [5], with all measures computed using the three relevance grades. Overall, the Match-Tensor model (with bi-LSTMs) is the most accurate individual model, with an 11% improvement in Area Under the Curve (AUC) of the Receiver Operating Characteristic (ROC) curve (right panel of the figure) over a BM25 baseline and smaller but consistent improvements on NDCG and ERR. While the relative ordering of models appears to be robust to variations in the test set, the values of these relative improvements appear to be sensitive to the composition of the test set: relative improvements when restricted to a subset of the test-set that are "hard" (at most half the available results are relevant) are much larger. The SSM architecture had lower NDCG than the BM25 baselines, which is consistent with [14] and others who have highlighted the limitation of models that only match semantic representations in relevance-matching tasks. The Match-Tensor is not only more accurate in aggregate but also more accurate at every cutoff: the precision of the model is higher than the others at all values of Recall.

Bi-LSTMs Vs. CNNs for Text Representation:

The use of convolutional neural networks in place of bi-LSTMs to compute the text representations in the first stage of each model architecture is tested. Table 3 shows that across the four model architectures under consideration, using bi-LSTMs results in more accurate models than their CNN counterparts in terms of AUC, NDCG, and ERR. For AUC in particular, the relative gain in AUC from using bi-LSTMs is between two to three percent. The fact that this increase holds for both SSM and the Match-Tensor architecture variants suggests that the improvements are due to bi-LSTMs—across the board—providing more accurate representations at each position. This outcome is consistent with gains in NDCG observed in [34] in going from convolutional to bi-LSTM-based semantic similarity models.

TABLE 3

Relative improvement for each model architecture when using bi-LSTMs over using CNNs

| Model | AUC | NDCG @1 | NDCG @3 | NDCG @10 | ERR |
|---|---|---|---|---|---|
| SSM | 2.02% | 1.10% | 0.83% | 0.67% | 0.74% |
| Match-Tensor | 2.87% | 1.18% | 1.04% | 0.66% | 0.58% |
| Match-Tensor + SSM | 2.07% | 0.59% | 0.57% | 0.33% | 0.43% |
| Match-Tensor (Exact Only) + SSM | 1.57% | 0.12% | 0.00% | 0.11% | 0.15% |

2-D Matching vs. SSM:

The Match-Tensor architecture outperforms the SSM architecture. Although both architectures are most accurate when using bi-LSTMs, the relative improvement when going from SSM to the Match-Tensor is substantial. This improvement holds even when using CNNs to represent the state at each query and document token: AUC goes up by 4% when using bi-LSTMs and 3% when using CNNs, suggesting that the improvement is a consequence of the underlying difference in architectures. The superiority of the Match-Tensor is not surprising given that the Match-Tensor architecture has a substantially more expressive matching function. Furthermore, combining the Match-Tensor and SSM architectures gives no substantial gain in performance: small improvements in AUC are offset by small reduction in NDCG and ERR. The absence of a difference for this hybrid architecture would suggest that the bi-LSTM representation at each position is already capturing global context sufficiently well to make the additional explicit per-document representation non-informative for this problem.

Influence of the Exact-Match Channel:

While the exact-match channel is introduced to account for out-of-vocabulary tokens where the bi-LSTM states might not be accurate, the exact-match channel is computed for all cases. The exact-match channel is an important contributor to the accuracy of the final model. However, the interplay between all channels improves the accuracy of the model further: the relative NDCG at 1 goes up by 2% with the bi-LSTM channels on compared to the exact-match alone model where the relative improvement is about 1%. This approximate doubling in relative accuracy when moving from the single channel to the full Match-Tensor model is seen across all positions in NDCG and in ERR.

Ensemble Models:

To determine if a deep relevance model is indeed capturing all essential relevance matching signals, ensemble models are introduced: boosted trees [9] that combine as inputs the neural model's output as a feature and a BM25 feature using 5-fold cross-validation on the existing validation set. Neural Models that capture essential relevance matching signals better should show relatively small improvements when BM25 is added to the mix, compared to those that do not since a good model should already capture most of the signals in BM25. Table 4 depicts that the Match-Tensor shows the smallest relative increase when BM25 is added to the mix compared to all other alternatives. An exact-match only Match-Tensor+SSM model also does better in this regard than SSM alone although the full Match-Tensor model is substantially better by allowing for interplay among channels even without having an explicit SSM-like component. Despite the small relative increase, the Match-Tensor & BM25 model is more accurate than all other ensemble variants and is nearly 1% more accurate than Match-Tensor(Exact only)+SSM&BM25. Thus, the Match-Tensor model is not only the most accurate model in this list, the Match-Tensor model also largely subsumes the semantic matching signals in SSM and the relevance matching signals in BM25 as indicated by the relative small improvement in accuracy when BM25 is added to it.

TABLE 4

Relative improvement in model accuracy by combining BM25 with original model.

| Model | AUC | NDCG @1 | NDCG @3 | NDCG @10 | ERR |
|---|---|---|---|---|---|
| SSM & BM25 | 3.29% | 2.53% | 2.11% | 1.33% | 1.47% |
| Match-Tensor & BM25 | 1.64% | 0.94% | 0.79% | 0.54% | 0.57% |
| Match-Tensor + SSM & BM25 | 1.52% | 1.05% | 0.882% | 0.65% | 0.57% |
| Match-Tensor (Exact only) + SSM & BM25 | 2.32% | 1.12% | 0.877% | 0.77% | 0.72% |

Model Introspection:

The strengths of the Match-Tensor model over other approaches are illustrated in Table 5 with a few examples. SSM is focused towards matching representations. As a result, SSM often misses out on relevance matching signals by finding a result about the same broad topic but different in several crucial details: as an example, for a query about a celebrity tv show, the model ranks a document about a different celebrity's TV show above a relevant result. Under its bag of words model, BM25 often scores results that have completely wrong phrases but the right set of tokens above a relevant result. An example with the query "low fat high carb" where the model prefers a result about "low carb high fat" over a relevant result describes the drawbacks of BM25 well. Traditional learning-to-rank methods address this problem with specifically engineering proximity and ordering features. The Match-Tensor, on the other hand, correctly ranks these results, learning the necessary proximity, ordering, grammatical, and other relationships directly from training examples. The Match-Tensor (Exact only)+SSM model uses only exact matches between query and document terms and relies on a single representation of query and document to capture semantic signals. The exact-only model results in subtler failures, often due to an over-reliance on the exact-match channel: for a query inquiring about scholarships for graduate programs, "scholarship to master degree," the exact-only model prefers a document that has the exact phrase but is semantically not useful to the searcher. The full Match-Tensor model correctly prefers another result that matches the intent of the query even though the document doesn't contain an exact match.

task within a specific social network, the Match-Tensor architecture might also be adaptable to search within other domains.

The ability to select diverse ways of computing similarity between query and document in the form of channels in the match-tensor model layer is a general and powerful primitive. Although this disclosure describes only a few design choices within this general design space (comparing bi-LSTMs to CNNs) in a particular manner, this disclosure contemplates increasing the diversity of these sources, using a mix of RNNs, CNNs and other notions of exact matching (by incorporating named entity linking, for example) in any suitable manner.

Systems and Methods

Figure 12:
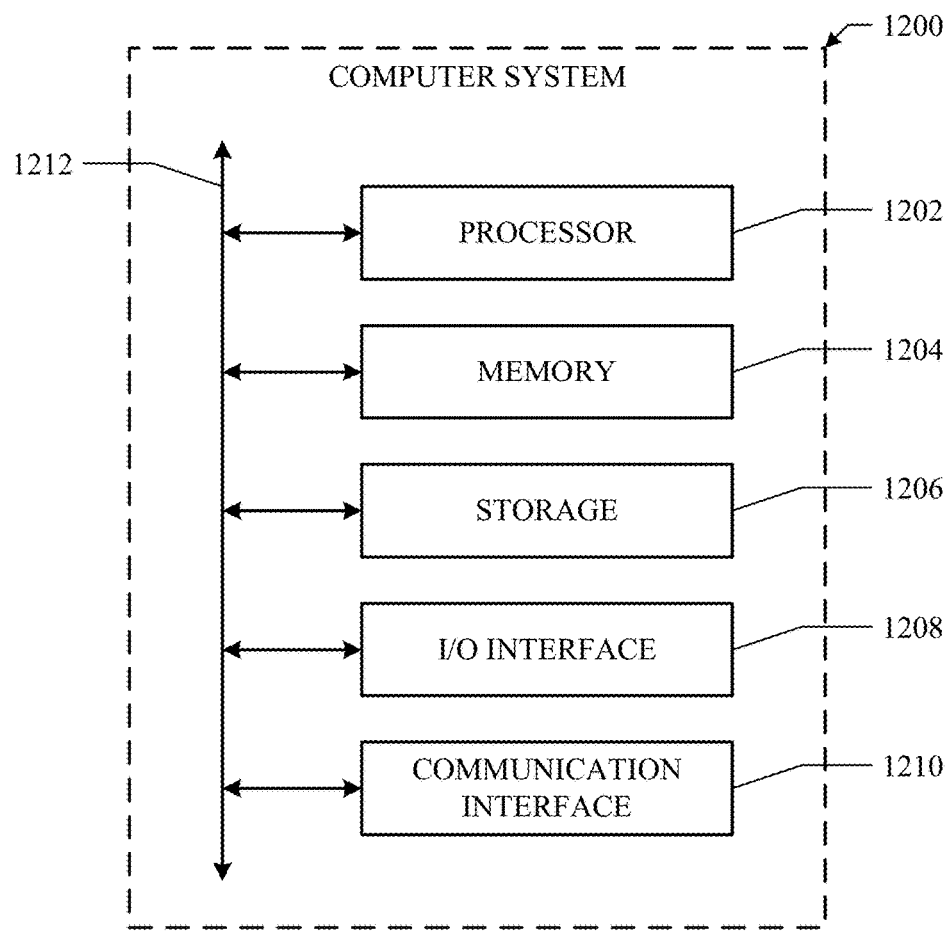
FIG. 12 illustrates an example computer system.

FIG. 12 illustrates an example computer system 1200. In particular embodiments, one or more computer systems 1200 perform one or more steps of one or more methods

TABLE 5

Illustrative examples highlighting pairs of results that were incorrectly ordered by a method but were correctly ordered by the Match-Tensor model

| Query | Irrelevant Result | Relevant Result | Method with incorrect ranking |
| --- | --- | --- | --- |
| ariana tv show | Leah Michele's tv show . . . | Ariana on the tv . . . | SSM |
| corn shucking song | Blackhawks playing the blues. . . | The corn shucking song . . . | SSM |
| cats acted like humans | . . . humans acted like cats . . . | . . . cats trying to act like humans . . . | BM25 |
| low fat high carb | Low carb high fat diet . . . | . . . popular low fat high carb . . . | BM25 |
| Cleveland wins nba championship | Golden State beats Cleveland in NBA championship . . . | Cleveland wins basketball championship . . . | Match-Tensor (Exact-only) + SSM |
| scholarship to master degree | My score is low for scholarship to master degree . . . | . . . Master's application and offers scholarship . . . | Match-Tensor (Exact-only) + SSM |

Concluding Discussion

Deep Neural Networks are a compelling development in machine learning that have substantially advanced the state-of-the-art in several disciplines [24]. While initial developments in several domains were focused on the absolute accuracy [21, 42] of these models when compared to alternatives, the focus has more recently gravitated towards the completeness of these models; indeed in several domains such as speech recognition, computer vision and machine translation, entire production systems have been completely replaced with neural networks that are trained end-to-end [15, 43].

Early neural network models for search focused on semantic matching signals which supplemented existing relevance matching features. By computing similarity between semantic representations of the query and document, this class of models naturally captured signals that were hard to determine using traditional models. However, this general class of models appears to miss critical relevance-matching signals [14]. The Match-Tensor, a new Deep Relevance model architecture for Search, is proposed. By simultaneously accounting for several notions of similarity with an expressive 3-D tensor layer and by deferring the combination of these signals into a relevance score to later layers, the Match-Tensor is able to achieve higher accuracies than other architectures. More interestingly, this architecture appears to largely subsume the signals in previous models: adding a SSM-like component to the model does not affect the accuracy of the final model, while the improvement when adding BM25 is small and far less than the corresponding improvements in other model architectures. Though the details of the model Match-Tensor architecture and the alternatives have been tailored for the search described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 1200 and one or more other computer systems 1200 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 1200 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

REFERENCES

1. Martin Abadi et al. 2015. TensorFlow: Large-Scale Machine Learning on Heterogeneous Systems. (2015). http://tensorflow.org/Software available from tensorflow.org.
2. Dzmitry Bahdanau, Kyunghyun Cho, and Yoshua Bengio. 2014. Neural machine translation by jointly learning to align and translate. arXiv preprint arXiv:1409.0473 (2014).
3. Christopher J C Burges. 2010. From RankNet to LambdaRank to LambdaMART: An overview. *Learning* 11 (2010), 23-581.
4. Zhe Cao, Tao Qin, Tie-Yan Liu, Ming-Feng Tsai, and Hang Li. 2007. Learning to rank: From pairwise approach to listwise approach. In 24*th International Conference on Machine learning*. ACM, 129-136.
5. Olivier Chapelle, Donald Metlzer, Ya Zhang, and Pierre Grinspan. 2009. Expected reciprocal rank for graded relevance. In 18*th ACM Conference on Information and Knowledge Management*. 621-630.
6. Daniel Cohen, Qingyao Ai, and W. Bruce Croft. 2016. Adaptability of neural networks on varying granularity IR tasks. arXiv preprint arXiv:1606 07565 (2016).
7. Nick Craswell, W Bruce Croft, Jiafeng Guo, Bhaskar Mitra, and Maarten de Rijke. 2016. Neu-IR: The SIGIR 2016 workshop on neural information retrieval. (2016).
8. Fernando Diaz, Bhaskar Mitra, and Nick Craswell. 2016. Query expansion with locally-trained word embeddings. arXiv preprint arXiv:1605.07891 (2016).

9. Jerome H Friedman. 2001. Greedy function approximation: A gradient boosting machine. *Annals of statistics* (2001), 1189-1232.
10. Debasis Ganguly, Dwaipayan Roy, Mandar Mitra, and Gareth J F Jones. 2015. Word embedding based generalized language model for information retrieval. In *38th International ACM SIGIR Conference on Research and Development in Information Retrieval*. ACM, 795-798.
11. Alex Graves and Jürgen Schmidhuber. 2005. Framewise phoneme classification with bidirectional LSTM and other neural network architectures. *Neural Networks* 18, 5 (2005), 602-610.
12. Mihajlo Grbovic, Nemanj a Djuric, Vladan Radosavljevic, and Narayan Bhamidipati. 2015. Search retargeting using directed query embeddings. In *24th International Conference on the World Wide Web*. ACM, 37-38.
13. Mihajlo Grbovic, Nemanja Djuric, Vladan Radosavljevic, Fabrizio Silvestri, and Narayan Bhamidipati. 2015. Context- and content-aware embeddings for query rewriting in sponsored search. In *38th International ACM SIGIR Conference on Research and Development in Information Retrieval*. ACM, 383-392.
14. Jiafeng Guo, Yixing Fan, Qingyao Ai, and W Bruce Croft. 2016. A deep relevance matching model for ad-hoc retrieval. In *25th ACM International on Conference on Information and Knowledge Management*. ACM, 55-64.
15. Geoffrey Hinton, Li Deng, Dong Yu, George E Dahl, Abdel-rahman Mohamed, Navdeep Jaitly, Andrew Senior, Vincent Vanhoucke, Patrick Nguyen, Tara N Sainath, and others. 2012. Deep neural networks for acoustic modeling in speech recognition: The shared views of four research groups. *IEEE Signal Processing Magazine* 29, 6 (2012), 82-97.
16. Sepp Hochreiter and Jürgen Schmidhuber. 1997. Long short-term memory. *Neural computation* 9, 8 (1997), 1735-1780.
17. Po-Sen Huang, Xiaodong He, Jianfeng Gao, Li Deng, Alex Acero, and Larry Heck. 2013. Learning deep structured semantic models for web search using clickthrough data. In *22nd ACM International Conference on Conference on Information & Knowledge Management*. ACM, 2333-2338.
18. Kevin Jarrett, Koray Kavukcuoglu, Yann LeCun, and others. 2009. What is the best multi-stage architecture for object recognition? In *Computer Vision, 2009 IEEE 12th International Conference on*. IEEE, 2146-2153.
19. Tom Kenter and Maarten de Rijke. 2015. Short text similarity with word embeddings. In *24th ACM International on Conference on Information and Knowledge Management*. ACM, 1411-1420.
20. Diederik Kingma and Jimmy Ba. 2014. Adam: A method for stochastic optimization. *arXiv preprint arXiv:1412.6980* (2014).
21. Alex Krizhevsky, Ilya Sutskever, and Geoffrey E Hinton. 2012. Imagenet classification with deep convolutional neural networks. In *Advances in neural information processing systems*. 1097-1105.
22. Siwei Lai, Liheng Xu, Kang Liu, and Jun Zhao. 2015. Recurrent Convolutional Neural Networks for Text Classification. In *29th AAAI Conference on Artificial Intelligence*. 2267-2273.
23. Yann LeCun and Yoshua Bengio. 1995. Convolutional networks for images, speech, and time series. *The handbook of brain theory and neural networks* 3361, 10 (1995), 1995.
24. Yann LeCun, Yoshua Bengio, and Geoffrey Hinton. 2015. Deep learning. *Nature* 521, 7553 (2015), 436-444.
25. Tie-Yan Liu. 2011. *Learning to rank for information retrieval*. Springer, Berlin.
26. Zhengdong Lu and Hang Li. 2013. A deep architecture for matching short texts. In *Advances in Neural Information Processing Systems*. 1367-1375.
27. Craig Macdonald, Rodrygo L. Santos, and Iadh Ounis. 2013. The whens and hows of learning to rank for web search. *Information Retrieval* 16, 5 (October 2013), 584-628.
28. Donald Metzler and W. Bruce Croft. 2005. A markov random field model for term dependencies. In *28th Annual International ACM SIGIR Conference on Research and Development in In-formation Retrieval*. 472-479.
29. Tomas Mikolov, Kai Chen, Greg Corrado, and Jeffrey Dean. 2013. Efficient estimation of word representations in vector space. *arXiv preprint arXiv:1301.3781* (2013).
30. Tomas Mikolov, Ilya Sutskever, Kai Chen, Greg Corrado, and Jeffrey Dean. 2013. Distributed Representations of Words and Phrases and Their Compositionality. In *26th International Conference on Neural Information Processing Systems*. 3111-3119.
31. Bhaskar Mitra. 2015. Exploring session context using distributed representations of queries and reformulations. In *38th International ACM SIGIR Conference on Research and Development in Information Retrieval*. ACM, 3-12.
32. Bhaskar Mitra, Fernando Diaz, and Nick Craswell. 2016. Learning to match using local and distributed representations of text for web search. *arXiv preprint arXiv:1610.08136* (2016).
33. Eric Nalisnick, Bhaskar Mitra, Nick Craswell, and Rich Caruana. 2016. Improving document ranking with dual word embeddings. In *25th International Conference Companion on the World Wide Web*. International World Wide Web Conferences Steering Committee, 83-84.
34. Hamid Palangi, Li Deng, Yelong Shen, Jianfeng Gao, Xiaodong He, Jianshu Chen, Xinying Song, and Rabab K. Ward. 2014. Se-mantic Modelling with Long-Short-Term Memory for Information Retrieval. *arXiv preprint arXiv:1412.6629* (2014).
35. Liang Pang, Yanyan Lan, Jiafeng Guo, Jun Xu, and Xueqi Cheng. 2016. A study of matchpyramid models on ad-hoc retrieval. *arXiv preprint arXiv:1606.04648* (2016).
36. Liang Pang, Yanyan Lan, Jiafeng Guo, Jun Xu, Shengxian Wan, and Xueqi Cheng. 2016. Text Matching as Image Recognition. *arXiv preprint arXiv:1602.06359* (2016).
37. Stephen E Robertson and Steve Walker. 1994. Some simple effective approximations to the 2-poisson model for probabilistic weighted retrieval. In *17th Annual nternational ACM SIGIR Conference on Research and development in Information Re-trieval*. 232-241.
38. Hasim Sak, Andrew W Senior, and Fran,coise Beaufays. 2014. Long short-term memory recurrent neural network architectures for large scale acoustic modeling. In *Interspeech*. 338-342.
39. Gerard Salton and Christopher Buckley. 1988. Term-weighting approaches in automatic text retrieval. *Information processing & management* 24, 5 (1988), 513-523.
40. Yelong Shen, Xiaodong He, Jianfeng Gao, Li Deng, and Grégoire Mesnil. 2014. A latent semantic model with convolutional-pooling structure for information retrieval. In *23rd ACM International Conference on Conference on Information and Knowledge Management*. ACM, 101-110.
41. Yelong Shen, Xiaodong He, Jianfeng Gao, Li Deng, and Grégoire Mesnil. 2014. Learning semantic representations using convolutional neural networks for web search. In *23rd International Conference on the World Wide Web.* ACM, 373-374.
42. Ilya Sutskever, Oriol Vinyals, and Quoc V Le. 2014. Sequence to sequence learning with neural networks. In *Advances in neural information processing systems.* 3104-3112.
43. Yonghui Wu, Mike Schuster, Zhifeng Chen, Quoc V Le, Mohammad Norouzi, Wolfgang Macherey, Maxim Krikun, Yuan Cao, Qin Gao, Klaus Macherey, and others. 2016. Google's Neural Machine Translation System: Bridging the Gap between Human and Machine Translation. *arXiv preprint arXiv:* 1609.08144 (2016).
44. Liu Yang, Qingyao Ai, Jiafeng Guo, and W Bruce Croft. 2016. aNMM: Ranking short answer texts with attention-based neural matching model. In *25th ACM International on Conference on Information and Knowledge Management.* ACM, 287-296.
45. Shuangfei Zhai, Keng-hao Chang, Ruofei Zhang, and Zhongfei Mark Zhang. 2016. Deepintent: Learning attentions for online advertising with recurrent neural networks. In *Proceedings of the 22nd ACM SIGKDD International Conference on Knowledge Discovery and Data Mining.* ACM, 1295-1304

What is claimed is:

1. A method comprising, by a computing system:
receiving, from a client system, a search query comprising a plurality of query terms;
generating a query match-matrix for the search query, wherein a first dimension of the query match-matrix corresponds to the query terms in the search query and a second dimension of the query match-matrix corresponds to n-dimensional embeddings representing the query terms in the search query, respectively, in an n-dimensional embedding space;
identifying a plurality of objects matching the search query;
retrieving, for each identified object, an object match-matrix for the identified object, wherein a first dimension of the object match-matrix corresponds to terms appearing in a text content of the object and a second dimension of the object match-matrix corresponds to n-dimensional embeddings representing the terms in the text content of the object, respectively, in the n-dimensional embedding space;
constructing, for each identified object, a three-dimensional tensor for the identified object by taking an element-wise product of the query match-matrix for the search query and the object match-matrix for the identified object, wherein a first dimension of the tensor corresponds to the query terms in the search query, a second dimension of the tensor corresponds to terms appearing in the text content of the object, and a third dimension of the tensor corresponds to the predetermined number of match channels, wherein each match channel calculates a weighted match similarity between the query and the object text, wherein the weighting for each channel is based on state-specific signals of the query and object text;
computing, for each identified object, a relevance score based on the tensor for the identified object, wherein the relevance score represents a degree of relevance between the search query and the object;
ranking the identified objects based on their respective relevance scores; and
sending, to the first client system in response to the search query, instructions for generating a search-results interface for presentation to the first user, the search-results interface comprising references to one or more of the identified objects presented in ranked order.

2. The method of claim 1, wherein the generating the query match-matrix for the search query comprises:
generating a plurality of term-embeddings associated with the plurality of query terms, respectively, based on a prepared word-embedding table, wherein each of the term-embeddings corresponds to a point in a d-dimensional embedding space; and
producing a query match-matrix for the search query by encoding the generated term-embeddings with a neural network, wherein the query match-matrix represents contextual meanings of the terms in the query, respectively, based on neighboring words and words located far behind or far ahead of the terms.

3. The method of claim 2, further comprises adjusting a size of the second dimension of the query match-matrix by performing a linear projection of the query match-matrix.

4. The method of claim 2, wherein the neural network is a bi-directional Long Short-Term Memory (LSTM) network comprising a series of states connected in forward and backward directions, wherein each state takes a term embedding for a respective term in the search query as an input and produces an encoded term embedding reflecting the contextual meaning of the corresponding term in the search query as an output by processing input term embedding and signals from both neighboring states.

5. The method of claim 2, wherein the prepared word-embedding table is created using a word-embedding model based on text contents of a plurality of objects created during a predetermined period of time.

6. The method of claim 2, wherein the prepared word-embedding table comprises unigrams and a plurality of selected bigrams.

7. The method of claim 2, wherein the word embedding model is word2vec model.

8. The method of claim 1, wherein identifying the plurality of objects comprises identifying objects containing text in their respective text content that matches one or more of the query terms.

9. The method of claim 1, wherein identifying the plurality of objects comprises:
identifying a set of candidate objects stored in one or more data stores;
retrieving, for each candidate object, an object match-matrix associated with the candidate object;
computing, for each candidate object, a similarity score representing a degree of similarity between the retrieved object match-matrix for the candidate object and the query match-matrix for the search query by comparing the object match-matrix and the query match-matrix; and
identifying objects that have the similarity score higher than a threshold.

10. The method of claim 9, further comprising:
receiving a request to post a first object to the computing system;
constructing an object match-matrix for the first object; and
storing the object match-matrix in the one or more data stores, wherein the object with a link to the object match-matrix is stored in the one or more data stores.

11. The method of claim 10, wherein constructing an object match-matrix for the first object comprises:
generating a plurality of term-embeddings associated with a plurality of terms in the text content of the first object, respectively, based on a prepared word-embedding table, wherein each of the term-embeddings corresponds to a point in a d-dimensional embedding space; and producing the object match-matrix for the first object by encoding the generated term-embeddings with a neural network, wherein the object match-matrix represents contextual meanings of the terms in the text content of the first object, respectively, based on neighboring words and words located far behind or far ahead of the terms.

12. The method of claim 1, further comprising:
appending, to each tensor, an exact-match channel, wherein an entry at position (i,j) of the exact-match channel is set to a non-zero value if an i-th term in the search query is an exact match to a j-th term in the text of the object and set to a zero value otherwise.

13. The method of claim 12, wherein the non-zero value is determined through a backpropagation process.

14. The method of claim 1, wherein computing the relevance score for each identified object based on the tensor for the identified object comprises:
generating a first three-dimensional matrix by performing a first series of convolutions on the tensor with one or more sets of first-convolution filters;
applying a Rectified Linear Unit (ReLU) activation function to the first three-dimensional matrix;
generating a second three-dimensional matrix by performing a second series of convolutions with a plurality of second-convolution filters on the first three-dimensional matrix;
constructing a predetermined size vector by performing a max-pooling procedure on the second three-dimensional matrix; and
calculating a relevance score by performing a sigmoid activation on the vector.

15. The method of claim 1, wherein each of the one or more sets of the first-convolution filters comprises a plurality of n-by-m-by-k first-convolution filters, wherein n is a first dimension size of the filter, the first dimension corresponding to the query terms, m is a second dimension size of the filter, the second dimension corresponding to the terms in the text content of the object, and k is a third dimension size of the filter, the third dimension corresponding to the match channels, wherein k is equal to the number of match channels of the tensor.

16. The method of claim 15, wherein a size of the second-convolution filters is 1-by-1-by-k', where k' is equal to a size of a third dimension of the first three-dimensional matrix, wherein the third dimension of the first three-dimensional matrix corresponds to convolution layers, wherein each convolution layer comprises output of convolutions with a first-convolution filter.

17. The method of claim 15, wherein a third dimension of the second three-dimensional matrix corresponds to convolution layers, wherein each convolution layer comprises output of convolutions with a second-convolution filter, wherein constructing the predetermined size vector by performing a max-pooling procedure comprises:
choosing, for each convolution layer of the second three-dimensional matrix, a maximum value; and
filling a corresponding element of the vector with the chosen value.

18. The method of claim 15, wherein the sigmoid activation on the vector produces a real-number score between 0 and 1.

19. One or more computer-readable non-transitory storage media embodying software that is operable when executed to:
receive, from a client system, a search query comprising a plurality of query terms;
generate a query match-matrix for the search query, wherein a first dimension of the query match-matrix corresponds to the query terms in the search query and a second dimension of the query match-matrix corresponds to n-dimensional embeddings representing the query terms in the search query, respectively, in an n-dimensional embedding space;
identify a plurality of objects matching the search query;
retrieve, for each identified object, an object match-matrix for the identified object, wherein a first dimension of the object match-matrix corresponds to terms appearing in a text content of the object and a second dimension of the object match-matrix corresponds to n-dimensional embeddings representing the terms in the text content of the object, respectively, in the n-dimensional embedding space;
construct, for each identified object, a three-dimensional tensor for the identified object by taking an element-wise product of the query match-matrix for the search query and the object match-matrix for the identified object, wherein a first dimension of the tensor corresponds to the query terms in the search query, a second dimension of the tensor corresponds to terms appearing in the text content of the object, and a third dimension of the tensor corresponds to the predetermined number of match channels, wherein each match channel calculates a weighted match similarity between the query and the object text, wherein the weighting for each channel is based on state-specific signals of the query and object text;
compute, for each identified object, a relevance score based on the tensor for the identified object, wherein the relevance score represents a degree of relevance between the search query and the object;
rank the identified objects based on their respective relevance scores; and
send, to the first client system in response to the search query, instructions for generating a search-results interface for presentation to the first user, the search-results interface comprising references to one or more of the identified objects presented in ranked order.

20. A system comprising: one or more processors; and a non-transitory memory coupled to the processors comprising instructions executable by the processors, the processors operable when executing the instructions to:
receive, from a client system, a search query comprising a plurality of query terms;
generate a query match-matrix for the search query, wherein a first dimension of the query match-matrix corresponds to the query terms in the search query and a second dimension of the query match-matrix corresponds to n-dimensional embeddings representing the query terms in the search query, respectively, in an n-dimensional embedding space;
identify a plurality of objects matching the search query;
retrieve, for each identified object, an object match-matrix for the identified object, wherein a first dimension of the object match-matrix corresponds to terms appearing in a text content of the object and a second dimension of the object match-matrix corresponds to n-dimensional embeddings representing the terms in the text content of the object, respectively, in the n-dimensional embedding space;

construct, for each identified object, a three-dimensional tensor for the identified object by taking an element-wise product of the query match-matrix for the search query and the object match-matrix for the identified object, wherein a first dimension of the tensor corresponds to the query terms in the search query, a second dimension of the tensor corresponds to terms appearing in the text content of the object, and a third dimension of the tensor corresponds to the predetermined number of match channels, wherein each match channel calculates a weighted match similarity between the query and the object text, wherein the weighting for each channel is based on state-specific signals of the query and object text;

compute, for each identified object, a relevance score based on the tensor for the identified object, wherein the relevance score represents a degree of relevance between the search query and the object;

rank the identified objects based on their respective relevance scores; and send, to the first client system in response to the search query, instructions for generating a search-results interface for presentation to the first user, the search-results interface comprising references to one or more of the identified objects presented in ranked order.

\* \* \* \* \*